United States Patent
Lindee et al.

(10) Patent No.: US 10,980,270 B2
(45) Date of Patent: Apr. 20, 2021

(54) PATTY-FORMING APPARATUS WITH TOP FEED AND ROTARY PUMP

(71) Applicant: PROVISUR TECHNOLOGIES, INC., Chicago, IL (US)

(72) Inventors: Scott A. Lindee, Mokena, IL (US); Paul Taylor, Munster, IN (US); Christopher Moore, Homer Glen, IL (US); E. William Wight, Roscoe, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 0 days.

(21) Appl. No.: 16/520,433

(22) Filed: Jul. 24, 2019

(65) Prior Publication Data
US 2020/0154754 A1     May 21, 2020

Related U.S. Application Data

(63) Continuation of application No. 15/928,908, filed on Mar. 22, 2018, now Pat. No. 10,383,354, which is a (Continued)

(51) Int. Cl.
*A22C 7/00*     (2006.01)
*A23P 30/10*     (2016.01)

(52) U.S. Cl.
CPC ............ *A23P 30/10* (2016.08); *A22C 7/0038* (2013.01); *A22C 7/0084* (2013.01)

(58) Field of Classification Search
CPC ...... A22C 7/0038; A22C 7/0084; A23P 30/10
See application file for complete search history.

(56) References Cited

U.S. PATENT DOCUMENTS

| 2,475,463 | A | 7/1949 | Santo |
| 3,137,029 | A | 6/1964 | De Zolt |

(Continued)

FOREIGN PATENT DOCUMENTS

| EP | 1765086 | 3/2007 |
| JP | S59-13091 U | 9/1984 |

(Continued)

OTHER PUBLICATIONS

Communication and Extended European Search Report for EP 20164174.3 dated Aug. 25, 2020, 13 pages.
(Continued)

*Primary Examiner* — James P Mackey
(74) *Attorney, Agent, or Firm* — Klintworth & Rozenblat IP LLP

(57) ABSTRACT

The food product machine with a food supply, a rotary food pump connected to the food supply, a molding mechanism having a mold plate and a knockout drive, and a mold plate reciprocating between a fill and a discharge position. The knockout drive reciprocates a knockout plunger to discharge molded food products from the mold plate, the mold plate being reciprocated between a cavity fill position and a cavity discharge position. The machine includes a manifold connected an outlet of the food pump and having an outlet passageway connected to an inlet of the molding mechanism for filling the cavity of the mold plate. The machine can further include a fill plunger system for increasing the fill pressure of the food mass prior to filling the mold cavities. Plungers extend into the manifold to displace food mass volume and increase the pressure in the manifold.

23 Claims, 31 Drawing Sheets

Related U.S. Application Data continuation of application No. 14/805,461, filed on Jul. 21, 2015, now Pat. No. 9,955,719, which is a continuation of application No. 14/317,872, filed on Jun. 27, 2014, now Pat. No. 9,095,171, which is a continuation of application No. 13/187,448, filed on Jul. 20, 2011, now Pat. No. 8,801,427.

(60) Provisional application No. 61/366,046, filed on Jul. 20, 2010.

(56) References Cited

U.S. PATENT DOCUMENTS

| | | |
|---|---|---|
| 3,800,362 A | 4/1974 | Wilson |
| 3,887,964 A | 6/1975 | Richards |
| 3,952,478 A | 4/1976 | Richard et al. |
| 4,043,002 A | 8/1977 | Brackman |
| 4,054,967 A | 10/1977 | Sandberg et al. |
| 4,065,241 A | 12/1977 | Orlowski |
| 4,182,003 A | 1/1980 | Lamartino et al. |
| 4,193,167 A | 3/1980 | Orlowski et al. |
| 4,302,868 A | 12/1981 | Wagner |
| 4,356,595 A | 11/1982 | Sandberg et al. |
| 4,372,008 A | 2/1983 | Sandberg |
| 4,516,291 A | 5/1985 | Goldberger et al. |
| 4,622,717 A | 11/1986 | Bollinger |
| 4,821,376 A | 4/1989 | Sandberg |
| 4,996,743 A | 3/1991 | Janssen |
| 5,618,571 A | 4/1997 | London et al. |
| 6,254,911 B1 | 7/2001 | Komatsu |
| 6,416,314 B1 | 7/2002 | LaBruno |
| 7,021,922 B2 | 4/2006 | Azzar |
| 7,159,372 B2 | 1/2007 | Lindee et al. |
| 7,255,554 B2 | 8/2007 | Lamartino et al. |
| 7,416,753 B2 | 8/2008 | Lindee et al. |
| 7,521,077 B2 | 4/2009 | Azzar |
| 8,613,615 B2 | 12/2013 | Lindee et al. |
| 8,801,427 B2 | 8/2014 | Lindee et al. |
| 9,095,171 B2 | 8/2015 | Lindee et al. |
| 9,955,719 B2 | 5/2018 | Lindee et al. |
| 2005/0230875 A1 | 10/2005 | Miller et al. |
| 2008/0069707 A1 | 3/2008 | Van Norman et al. |
| 2008/0181997 A1 | 7/2008 | Cowart |

FOREIGN PATENT DOCUMENTS

| | | |
|---|---|---|
| WO | 2005/107482 A1 | 11/2005 |
| WO | 2008/088887 A2 | 7/2008 |

OTHER PUBLICATIONS

Communication and Extended European Search Report for EP 20164181.8 dated Aug. 27, 2020, 10 pages.
Communication and Partial European Search Report for EP 20164182.6 dated Aug. 25, 2020, 19 pages.
English machine translation of JPS59-139091.

PATTY-FORMING APPARATUS WITH TOP FEED AND ROTARY PUMP

This application is a continuation of U.S. Non-Provisional patent application Ser. No. 15/928,908, filed Mar. 22, 2018, now U.S. Pat. No. 10,383,354, issued Aug. 20, 2019; which is a continuation of U.S. Non-Provisional patent application Ser. No. 14/805,461, filed Jul. 21, 2015, now U.S. Pat. No. 9,955,719, issued May 1, 2018; which is a continuation of U.S. Non-Provisional patent application Ser. No. 14/317,872, filed Jun. 27, 2014, now U.S. Pat. No. 9,095,171, issued Aug. 4, 2015; which is a continuation of U.S. Non-Provisional patent application Ser. No. 13/187,448, filed Jul. 20, 2011, now U.S. Pat. No. 8,801,427, issued Aug. 12, 2014; which claims the priority benefit of U.S. Provisional Application No. 61/366,046, filed Jul. 20, 2010, the entire contents of all are incorporated by reference herein.

BACKGROUND OF THE INVENTION

Increasing use of pre-processed foods, both in homes and in restaurants, has created a continuously growing demand for high-capacity automated food processing equipment.

That demand is particularly evident with respect to hamburgers, molded steaks, fish cakes, and other molded food patties.

Food processors utilize high-speed molding machines, such as FORMAX® MAXUM700®, F6™, F12™, F19™, F26™, or F400™ reciprocating mold plate forming machine, available from Formax, Inc. of Mokena, Ill., U.S.A., for supplying patties to the fast food industry. High-speed molding machines are also described for example in U.S. Pat. Nos. 3,887,964; 4,372,008; 4,356,595; 4,821,376; 4,996,743, and 7,255,554.

Although heretofore known FORMAX patty-molding machines have achieved commercial success and wide industry acceptance, the present inventors have recognized that needs exist for a forming machine having an even greater energy efficiency, an even greater durability, and an even greater duration of maintenance free operation. The present inventors have recognized that needs exist for an enhanced controllability and ability to tune a patty-forming machine for particular food materials to be processed, for an enhanced effectiveness of a patty-forming machine in producing uniform patties, for an even greater output rate of patties from a patty-forming machine, for an enhanced convenience for cleaning and maintenance of a patty-forming machine, and for a smoother and quieter patty-forming machine operation.

SUMMARY OF THE INVENTION

The food product forming machine of the invention provides an automated food product molding machine capable of producing uniform molded food products, such as food patties, at a high rate of production.

The food product machine has a food supply, a rotary food pump connected to the food supply, a molding mechanism having a mold plate and a knockout drive, and a mold plate configured to be driven to reciprocate between a fill position and a discharge position. The knockout drive is for reciprocating a knockout plunger to discharge molded food products from a cavity in the mold plate, the mold plate being reciprocated by a mold plate drive between a cavity fill position and a cavity discharge position. The knockout drive is positioned below the mold plate. The machine further includes a manifold connected an outlet of the food pump and having an outlet passageway connected to an inlet of the molding mechanism for filling the cavity of the mold plate.

In one embodiment the outlet of the food pump is located above the mold plate and an inlet of the pump is located above the mold plate. The food pump is a positive displacement pump. The pump has two rotors configured to create a vacuum between the inlet and the outlet when driven to rotate for drawing food product to the outlet.

In one embodiment, the rotary food pump has two rotors. Each rotor has at least two wings and each rotor has an area of rotation that overlap with the other rotor. The pump has a drive shaft and a driven shaft, the drive shaft has a drive gear at a first end and one of the rotors at the second end, the driven shaft has a driven gear at a first end and the other of the rotors at the second end; the drive and driven gears are meshed to operate the rotors in sync.

The machine has a pump motor connected to a drive shaft of the rotary pump. The pump motor is a servo rotary actuator.

In one embodiment, the machine has a hopper for holding a supply of food product, and an auger system configured to force food product through an outlet of the hopper. The auger system has at least a feed screw configured to move food product longitudinally forward in the hopper toward the outlet.

The feed screw is located in the hopper connected to a feed screw drive configured to rotate the feed screw. The feed screw is located at the bottom of the hopper. The feed screw is positioned horizontally in the bottom of the hopper and is configured to rotate and drive food product toward the front of the hopper.

The hopper has an outlet at the front of the hopper. The outlet extends from the floor of the hopper upward at the front of the hopper.

In one embodiment, the outlet extends forward of the main hopper body and encloses a forward portion of the feed screw. The outlet has a connecting section connected to the main hopper body, and a narrowing section opposite the connecting section.

In one embodiment, the hopper has an opening at the lower rear of the hopper configured to remove the feed screw therethrough for maintenance, and a cap for removably covering the opening; the feed screw journaled to rotate in an opening of the cap.

In one embodiment, the feed screw drive is located outside of the hopper and is axially aligned and connected with a shaft of the feedscrew. The feed screw is longitudinally orientated at the bottom of the hopper.

In one embodiment, the auger system has a plurality of feed screws located in the hopper. The feed screws are located adjacent to each other and adjacent to the floor of the hopper.

In one embodiment, the food product forming machine comprises a plunger fill system to assist in filling mold cavities. The plunger fill system comprises a pair of plungers which can be lowered into the intake manifold to provide an increase in fill pressure by displacing a predetermined volume of food mass.

Numerous other advantages and features of the present invention will be become readily apparent from the following detailed description of the invention and the embodiments thereof, from the claims and from the accompanying drawings.

DETAILED DESCRIPTION

Figure 1:
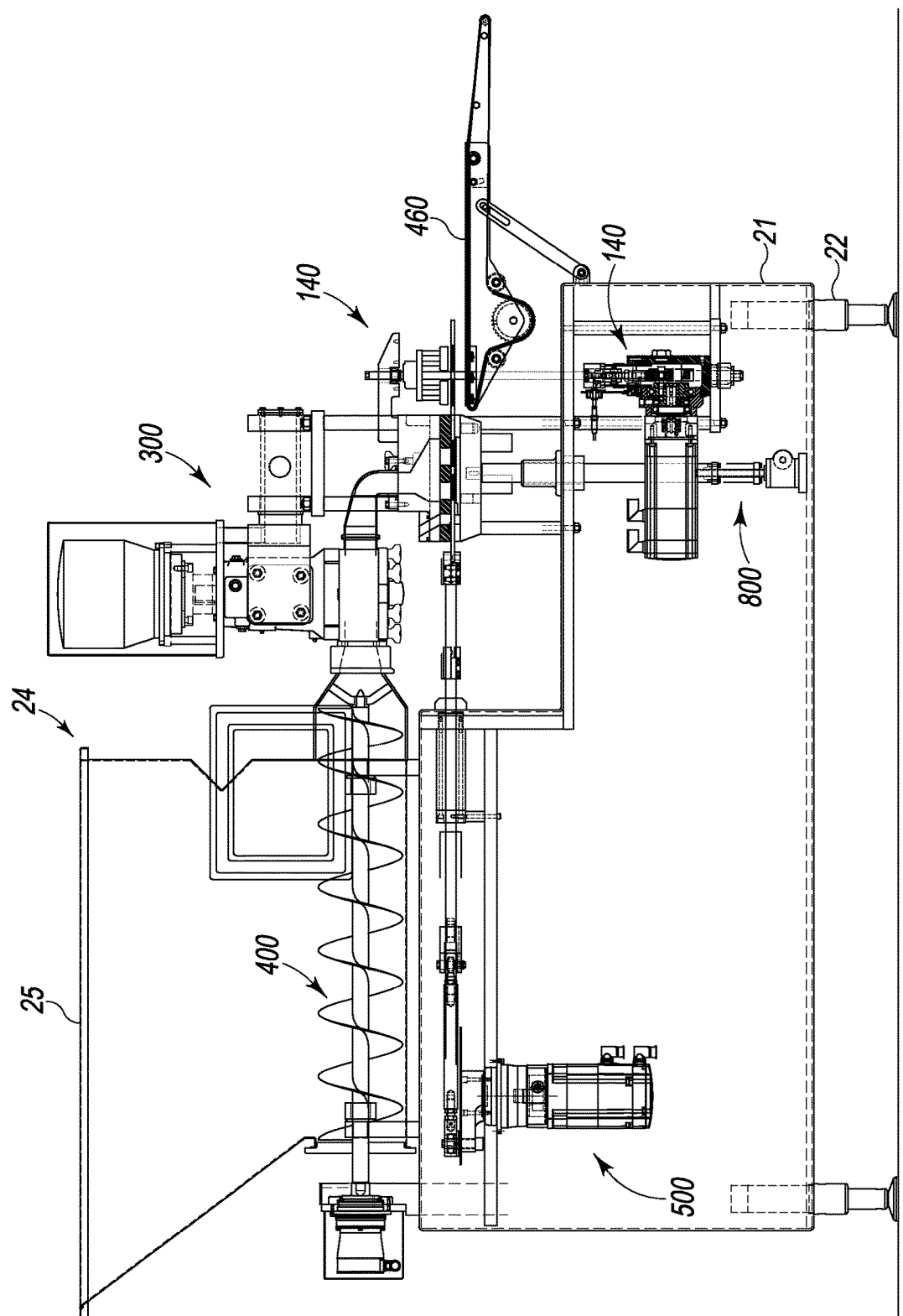
FIG. 1 is a side view of the food product forming machine of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Machine Overview

The food product forming machine or food patty molding machine 100 is illustrated in FIGS. 1-13. The molding machine 100 includes a machine base 21, optionally mounted upon a plurality of feet 22, rollers or wheels. The machine base 21 supports the operating mechanism for machine 100 and contains electrical actuating systems, and most of the machine controls. The machine 100 includes a food supply system 24 for supplying moldable food material, such as ground beef, fish, or the like, to the processing mechanisms of the machine. A control panel, such as a touch screen control panel 601, is arranged on a forward end of the machine 100.

As generally illustrated in FIGS. 1, 2, 4A-8, the food supply system includes an auger system 400 and a hopper 25 that opens into the intake of a food pump system 300. The food pump system 300 includes at least one food pump, described in detail hereinafter, that continuously, or intermittently under a pre-selected control scheme controlled by a machine control or controller 23, pump food, under pressure, into a manifold 27 flow-connected to a cyclically operated molding mechanism 28. Generally during operation of the machine 100, the pump is forcing food material under pressure into the intake of manifold 27. The operation of the machine is controlled the machine control 23.

In the operation of machine 100, a supply of ground beef or other moldable food material is deposited into hopper 25 from overhead. An automated refill device (not shown) can be used to refill the hopper when the supply of food product therein is depleted. At the bottom of the hopper 25 is the auger system 400 for moving the food material longitudinally of the hopper 25 to the inlet 301 of the food pump system 300.

The manifold 27 comprises a system for feeding the food material, still under relatively high pressure, into the molding mechanism 28. Molding mechanism 28 operates on a cyclic basis, first sliding a multi-cavity mold plate 32 into a receiving position over manifold 27 and then away from the manifold to a discharge position aligned with a series of knock out cups 33. When the mold plate 32 is at its discharge position, knock out cups 33 are driven downwardly, discharging hamburgers or other molded patties from machine 100, as indicated by direction A in FIG. 2. The molded patties are deposited onto a conveyor 460 that is positioned under the knockout cups 33, to be transported away from the machine 100.

Food Supply System

The food supply system 24 includes the hopper and the auger system 400, as shown in FIGS. 1, 2, 4A-8. The auger system 400 is located at the bottom of the hopper 25. The auger system includes two feed screws 402, 404, and two feed screw drive motors 406, 408. The feed screws 402, 404 each have a center shaft 410, 412. The center shaft is journaled in and supported by front and rear feed screw supports 414, 422. The feed screw supports extend vertically from and attach to the machine base 21. The feed screws are located adjacent to one another and extend longitudinally along the bottom of the hopper. The center shafts are parallel to the bottom 527 of the hopper.

Figure 5:
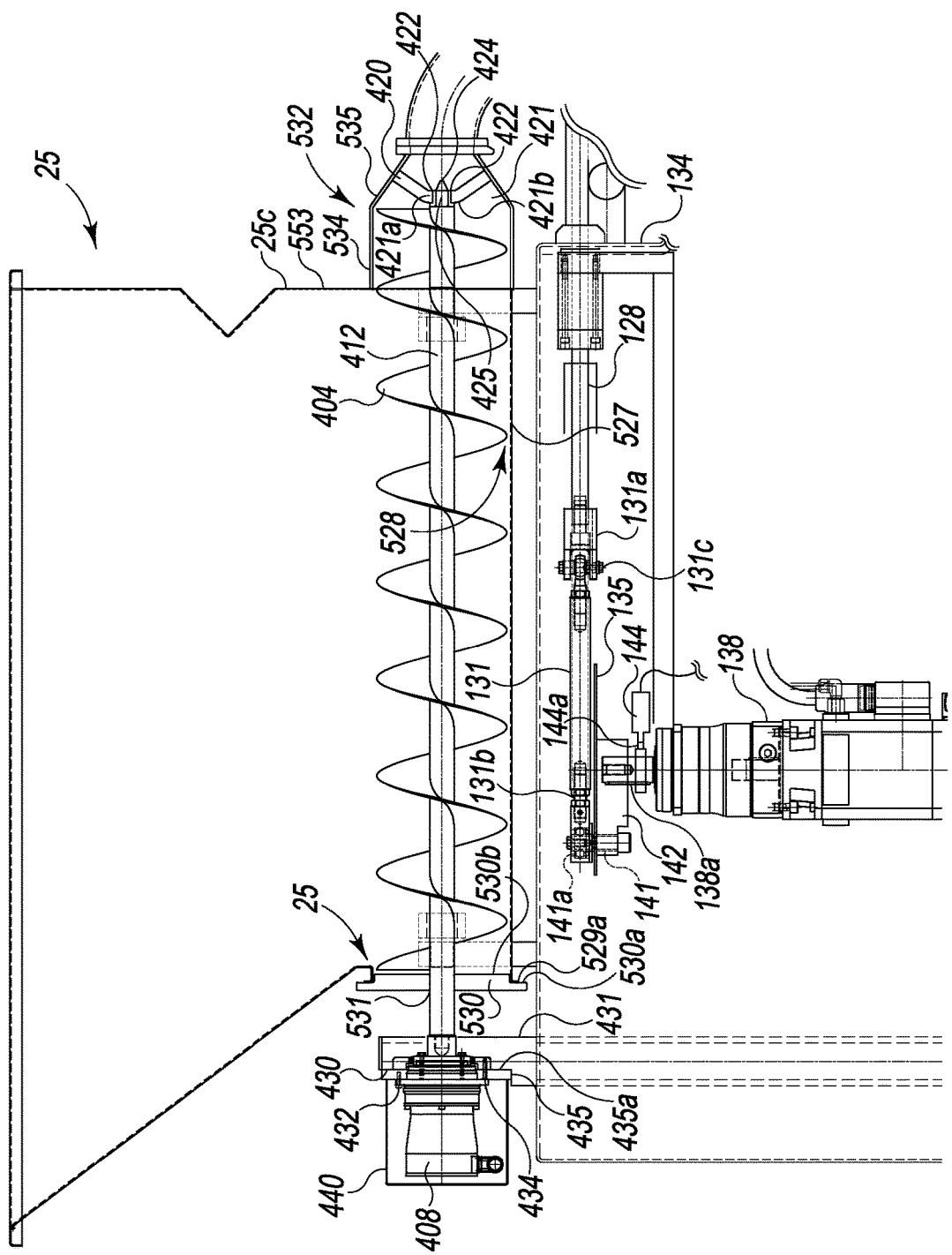
FIG. 5 is a partial side view of the machine of FIG. 1.

As shown in FIG. 5, the rear 25c of the hopper has an opening that is covered by a cap 530. The cap 530 has holes 531 that the feed screw shafts are journaled to rotate therein on bearings. The shafts extend through the cap to connect to the motors 406, 408. The rear opening of the hopper has a vertical lip 529a. The back of the cap has a recessed portion 530a that mates with the lip 529a. The cap also has a non-recessed portion 530b that fits into the rear opening.

Figure 3:
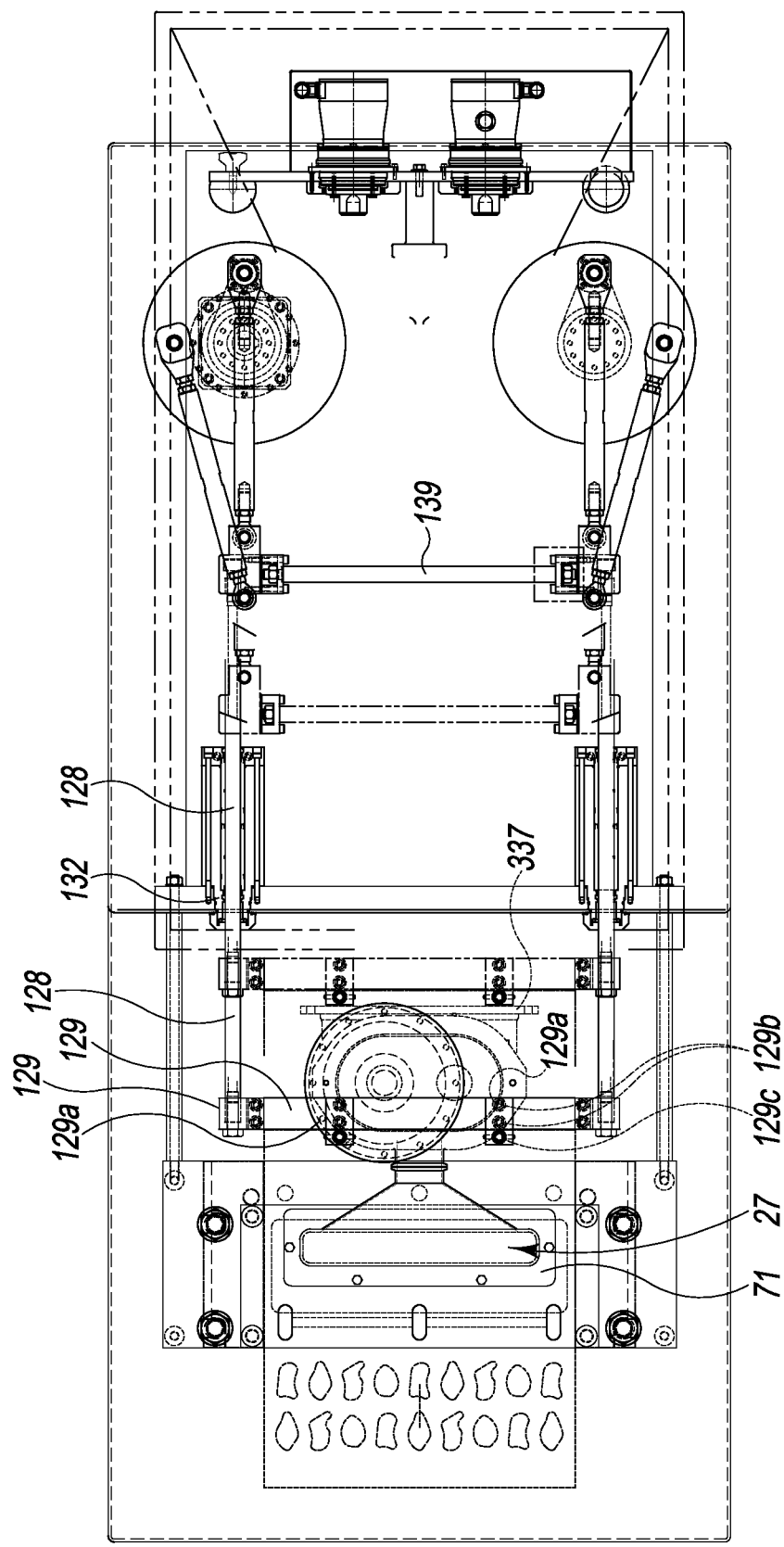
FIG. 3 is a top view of the machine of FIG. 1 with certain components not shown.

A hopper outlet 532 is formed to or attached to the front 533 of the hopper 25. A portion of the outlet opening is aligned with the bottom floor 527 of the hopper and the opening extends upwardly from the floor 527. The outlet extend forward of the main hopper body 25*c* as shown in FIG. 5. The outlet has a connecting section 534 and a narrowing section 535 that narrows to an outlet flange 536 toward the food pump system 300. The outlet has a width that is greater than its height. Upper and lower feed screw supports 420, 421 extend from the conical section 535 to a bearing head or sleeve 422. The supports 420, 421 are perpendicular to the conical section 535 inside surface and extend therefrom to an elbow 421*a*, 421*b* and bearing sleeves 422. The front of the shafts 412, 410 have a recessed portion 425 that terminates in a conically reducing point end 424. The point end 424 extends beyond the bearing sleeves 422. The shafts 410, 412 are journaled to rotate at the front on the recessed portion 425 in the bearing sleeves. As shown in FIG. 3, a front portion 404*a* of each feed screw is enclosed by the outlet and extends beyond the main hopper body 25*c*.

Figure 6:
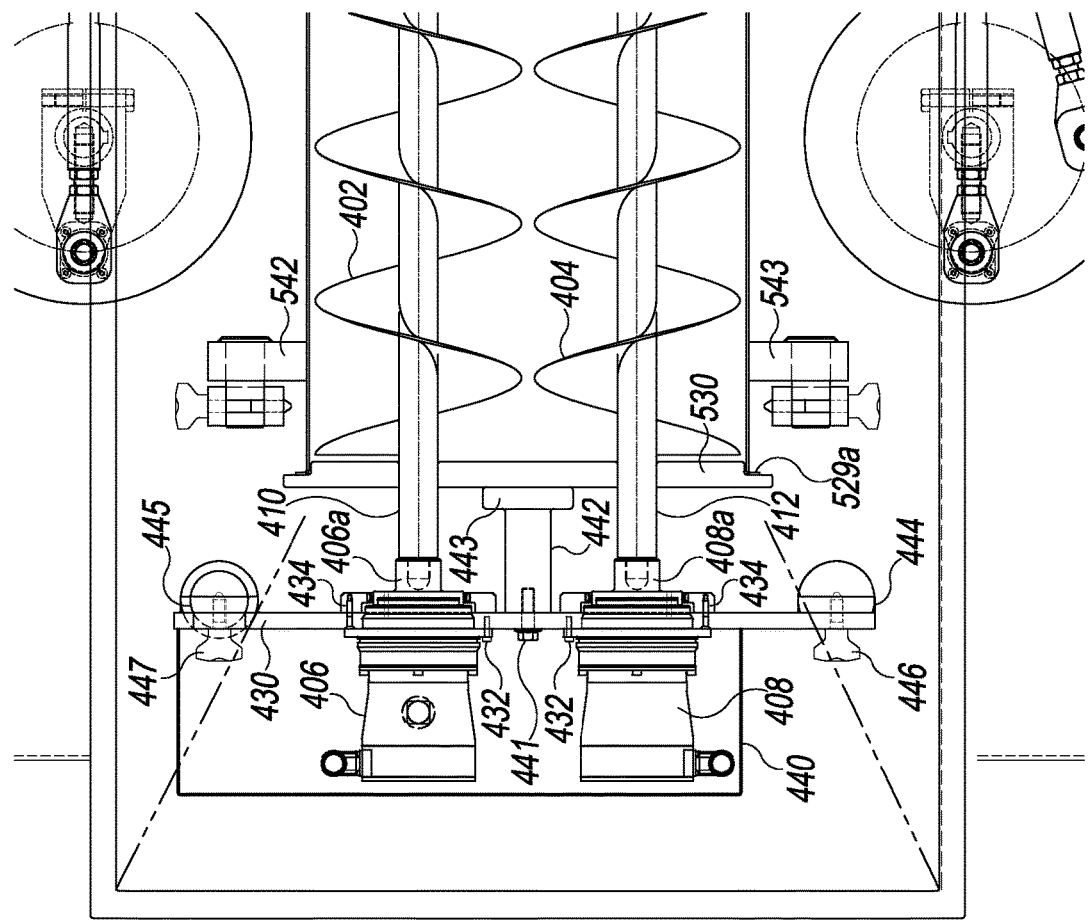
FIG. 6 is a partial top view of the machine of FIG. 1.

As shown in detail in FIGS. 5 and 6, the feed screw drive motors 406, 408 are mounted to a feed screw drive motor support plate 430 by screws, studs, or bolts 432. The support plate 430 is attached to a support mount 431 by screws or bolts 434. The support mount 431 is attached to vertical support members 444, 445 by fasteners 446, 447 respectively. The vertical support members 444, 445 extend vertically from the machine base 21 and are supported thereon. The support mount 431 has a ledge 435 defining a recessed area 435*a*. The support plate is located in the recessed area 435*a* and on the ledge 435. The drive motors, 406, 408 are enclosed by a drive motor housing 440. The drive motor housing 440 is attached to the support plate 430. The motors 406, 408 are axially aligned with the corresponding feed screws 402, 404 respectively. Output shafts 406*a*, 408*a* are coaxial with the corresponding feed screw shafts 410, 412 respectively. The supports hold the feed screw slightly above the bottom 527 surface of the hopper 25 to form a small gap 528 between the feed screw and the bottom.

A cap retaining brace 442 is attached by a bolt 441 to the support plate 430 and extends forward to contact the cap 530 by a wide member base 443 to hold the cap engaged with the hopper 25.

The feed screws 402, 404 are removable from the hopper for service and cleaning. To remove the feed screws 402, 404, the support plate 430 and the support mount 431 are disconnected from the vertical support members 444, 445 via the fasteners 446, 447. The support mount 431 is moved longitudinally rearward and the recessed portions 425 of the feed screw shaft are withdrawn from the bearing sleeves 422 at the front and the feed screws are withdrawn rearward from the hopper.

Hopper

Figure 7:
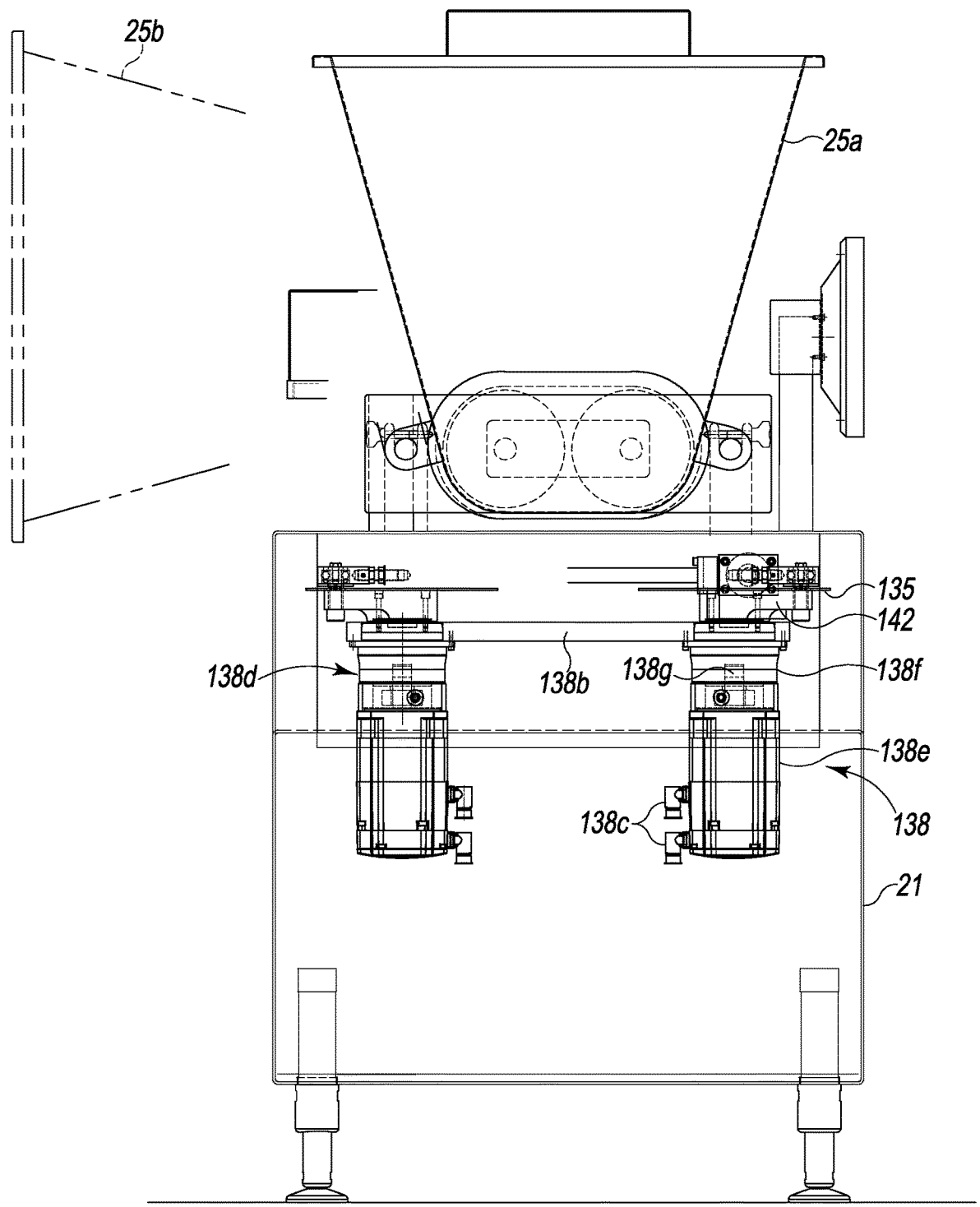
FIG. 7 is a rear view of the forming machine of FIG. 1.

The hopper is shown in FIGS. 1, 4, 5, 7, and 8. As shown in FIG. 7, the hopper 25 has a working position 25*a* and a service position 25*b*. When the hopper is in the service position it is tilted 90 degrees to the right or left side to permit a person to more easily clean or service the hopper.

Figure 4A:
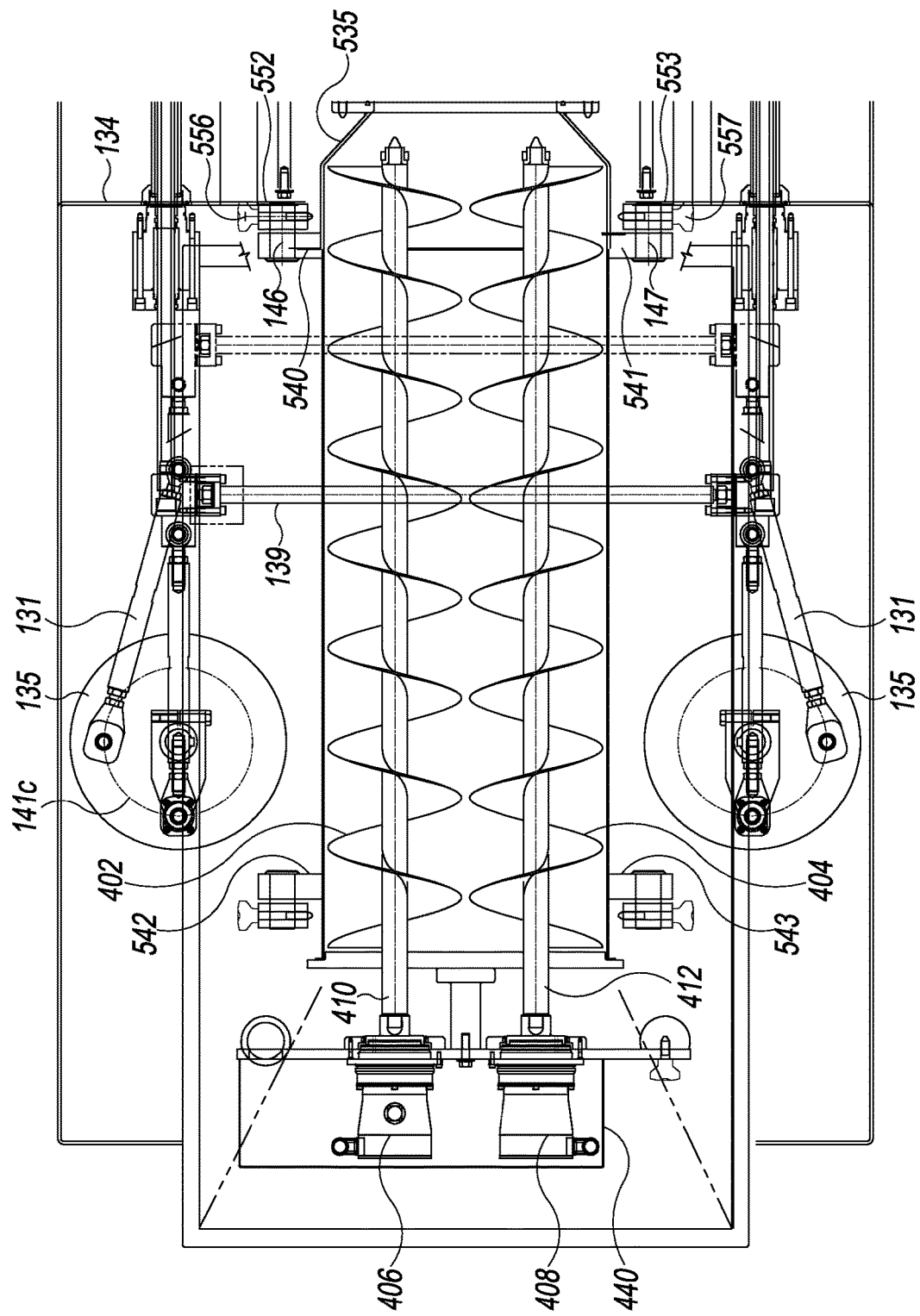
FIG. 4A is a second partial top view of the machine of FIG. 1.
Figure 4B:
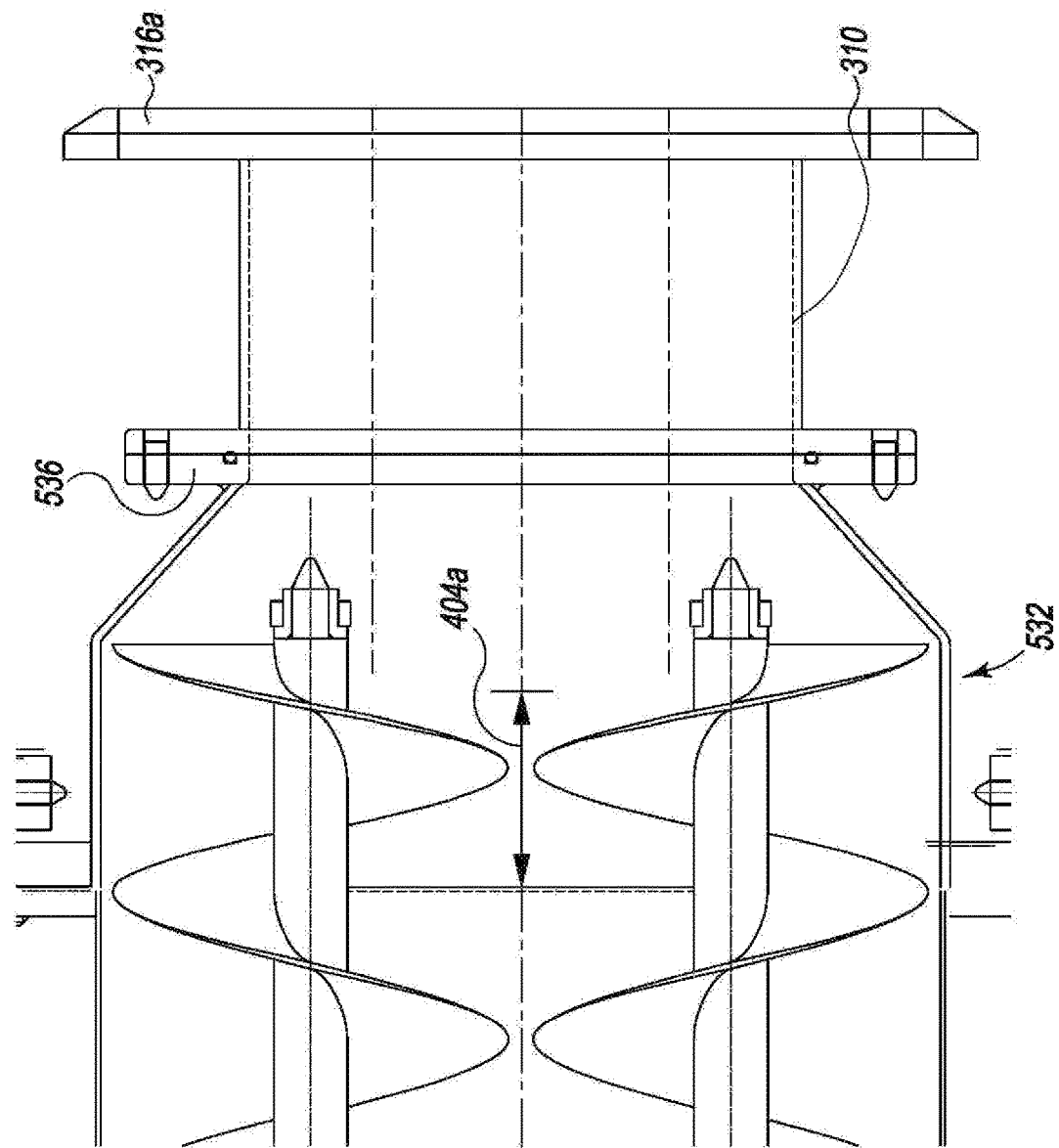
FIG. 4B is a top view of a portion of the auger system taken from FIG. 4A.
Figure 8:
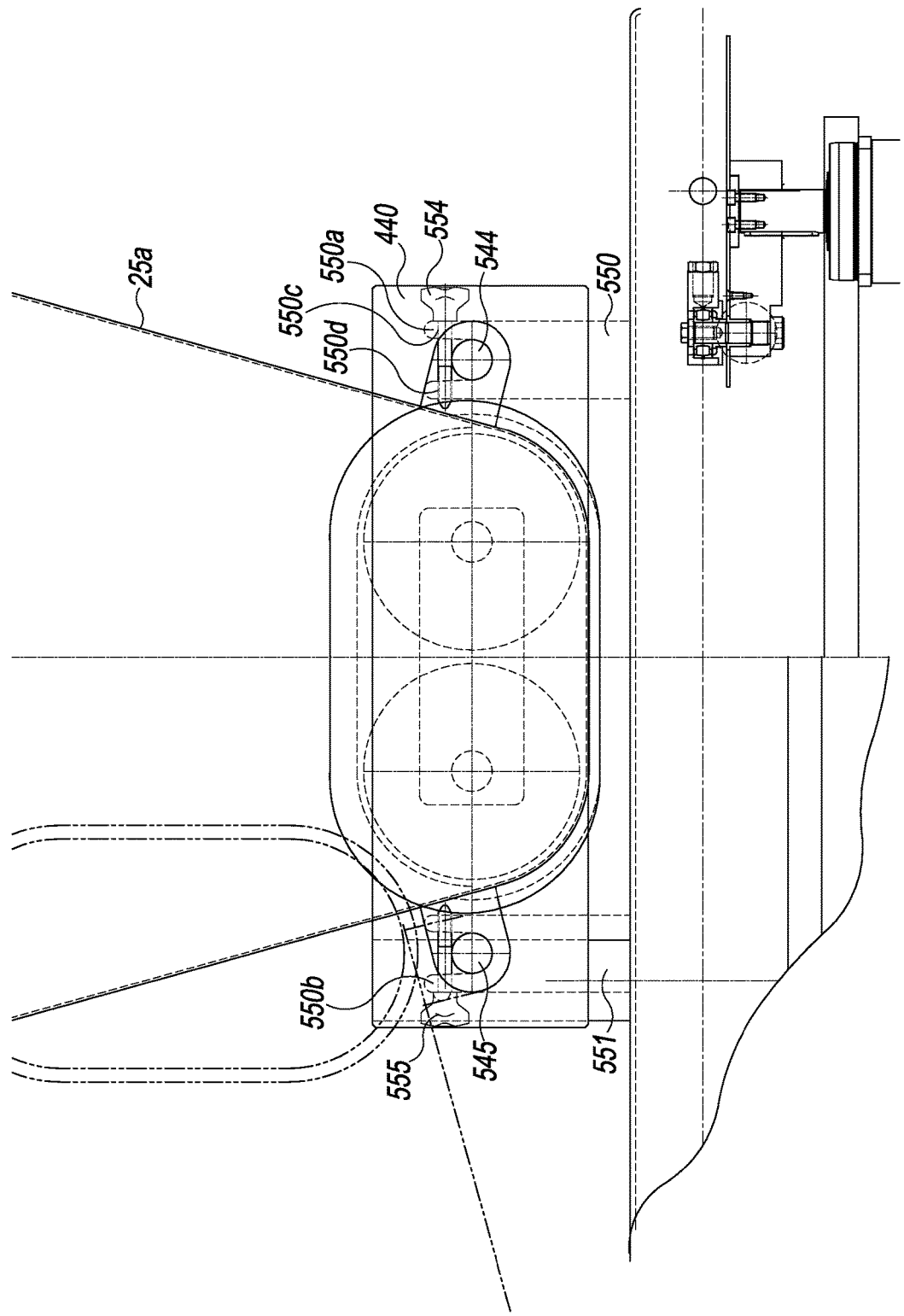
FIG. 8 an enlarged partial rear view of the forming machine taken from FIG. 7.

As shown in FIG. 4A, the hopper 25 has front and rear pairs of mounting arms 540, 541, 542, 543. Each mounting arm has a horizontal support pin 544, 545, 546, and 547. The front mounting pins extend forwardly from the front mounting arms 540, 541 and the rear mounting pins extend rearward from the rear mounting arms 542, 543. The pins engage a hopper support 550, 551, 552, 553. Each hopper support, as best shown in FIG. 8, has a U-shaped end 550*a*, 550*b* (not labeled for front hopper supports). The outer end of each pin lies in the U-shaped channel of the U-shaped end. Each U-shaped end has a part of co-linear holes 550*c*, 550*d* (labeled only for support 550) penetrating an upper portion of the U-shaped end. The co-linear holes are located above the area that the pin would occupy in the U-shaped channel. Retaining pins are removably placed through the co-linear holes when the support pin is in the U-shaped channel to secure the hopper to the hopper supports.

To move the hopper from the working position to the service position, each of the retaining pins on one lateral side of the machine are removed and the hopper is tilted to the service position in the direction opposite of the lateral side where the retaining pins were removed.

The hopper pivots toward the side were the retaining pins remain in place and the hopper pivots on the support pins. Likewise to move the hopper to the working position from the service position, the hopper is tilted toward the side of the machine where the retaining pins were removed, until the support pins on that side engage the U-shaped supports. Then the retaining pins are secured through the co-linear holes to secure the hopper in the working position.

Food Pump System

The food pump system 300 of the machine 100 is shown in FIGS. 1, 2, 12-13B, 14A-17. The pump system 300 comprises a rotary pump 330, a pump motor 350, a mounting bracket 302, a pump intake passage 310, and a pump output passage 316.

Figure 2:
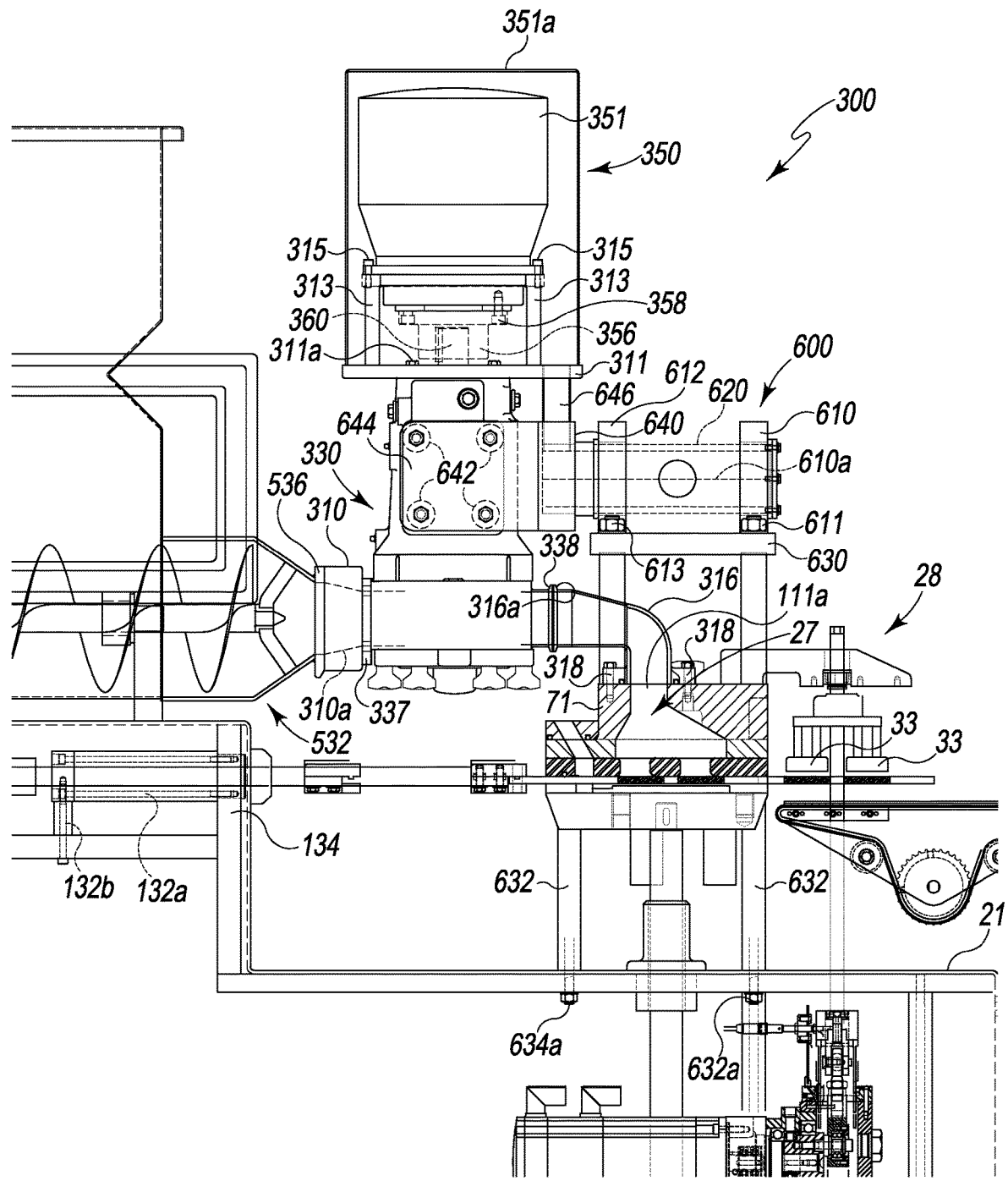
FIG. 2 is an enlarged side view of a rotary pump and molding mechanism of the food product forming machine taken from FIG. 1.

The outlet flange 536 of the hopper outlet 532 connects to a pump intake passage 310. A gasket may be provided between the outlet flange 536 and the pump intake passage to seal the connection therebetween. The intake passage 310 has a vertically narrowing passage 310*a* to connect to the pump intake flange 337 which surrounding the intake opening inlet 334 of the food pump 330. In one embodiment, the intake has a width in the transverse direction that is as wide as the food pump inlet 334 and the hopper outlet 532. The intake passage narrows vertically as shown in FIG. 2. The intake flange is located at a vertical position that is higher than the vertical position of the mold plate 32.

The pump 330 is mounted and supported by a trunnion mount system 600. The trunnion mount includes a rotatable cylinder 620 that rides within a front collar support 610 and a back collar support 612. The support collars 610, 612 are attached to a cross member 630 that is supported and connected to a pair of vertical frame supports 632, 634 that are attached to the machine base 21 by bolts 632*a*, 634*a*. The front and back supports 610, 612 have circular holes that are aligned and within which the cylinder 620 is supported. The cylinder connects at the rear end to a mounting bracket 640, 644 that surrounds the gear area 332*c* of the pump 330. The pump is connected to the bracket on at least one side by a four bolts 642. A vertically extending support 646 is connected to the mounting bracket and extends upward to a vertical mounting plate 311.

The pump 330 has an inlet that is located above the mold plate 32 and the manifold 27. The pump has an outlet that is located above the mold plate 32 and the manifold 27. To facilitate maintenance and cleaning, the pump 330 and pump motor 350 are rotatable on the trunnion mount system 600 between a working position as shown the location of the outlet 338*d* and a maintenance position as shown by the location of the outlet 338*c* in FIG. 13A. In the working position, an outlet 338 of the pump 330 is connected to the output passage 316. In one embodiment, the pump 330 and motor 350 are substantially perpendicular to the mold plate 32 when in the working position and the pump 330 and motor 350 are parallel to the mold plate 32 when in the maintenance position.

Figure 13A:
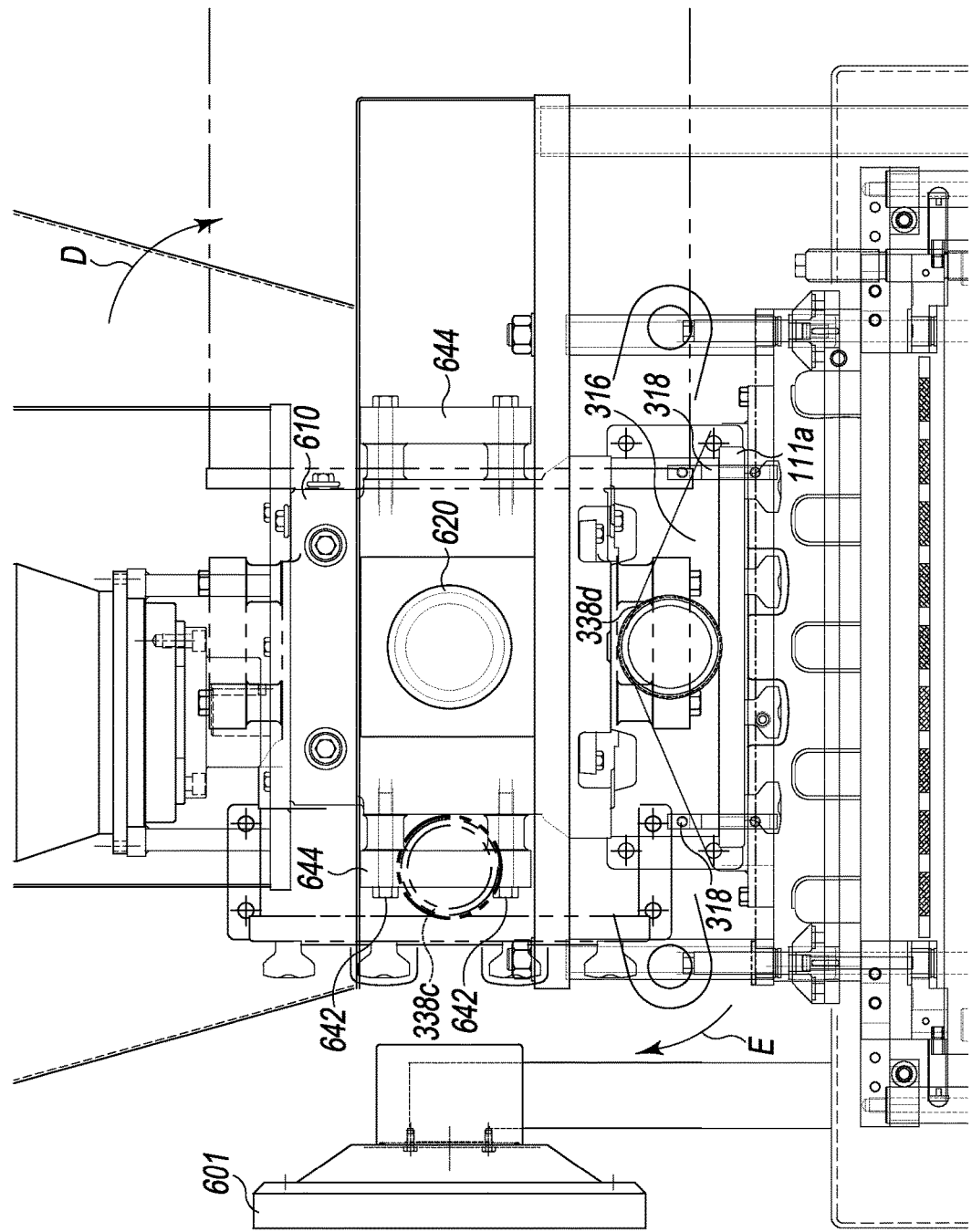
FIG. 13A is a partial top view of the machine of FIG. 1.
Figure 13B:
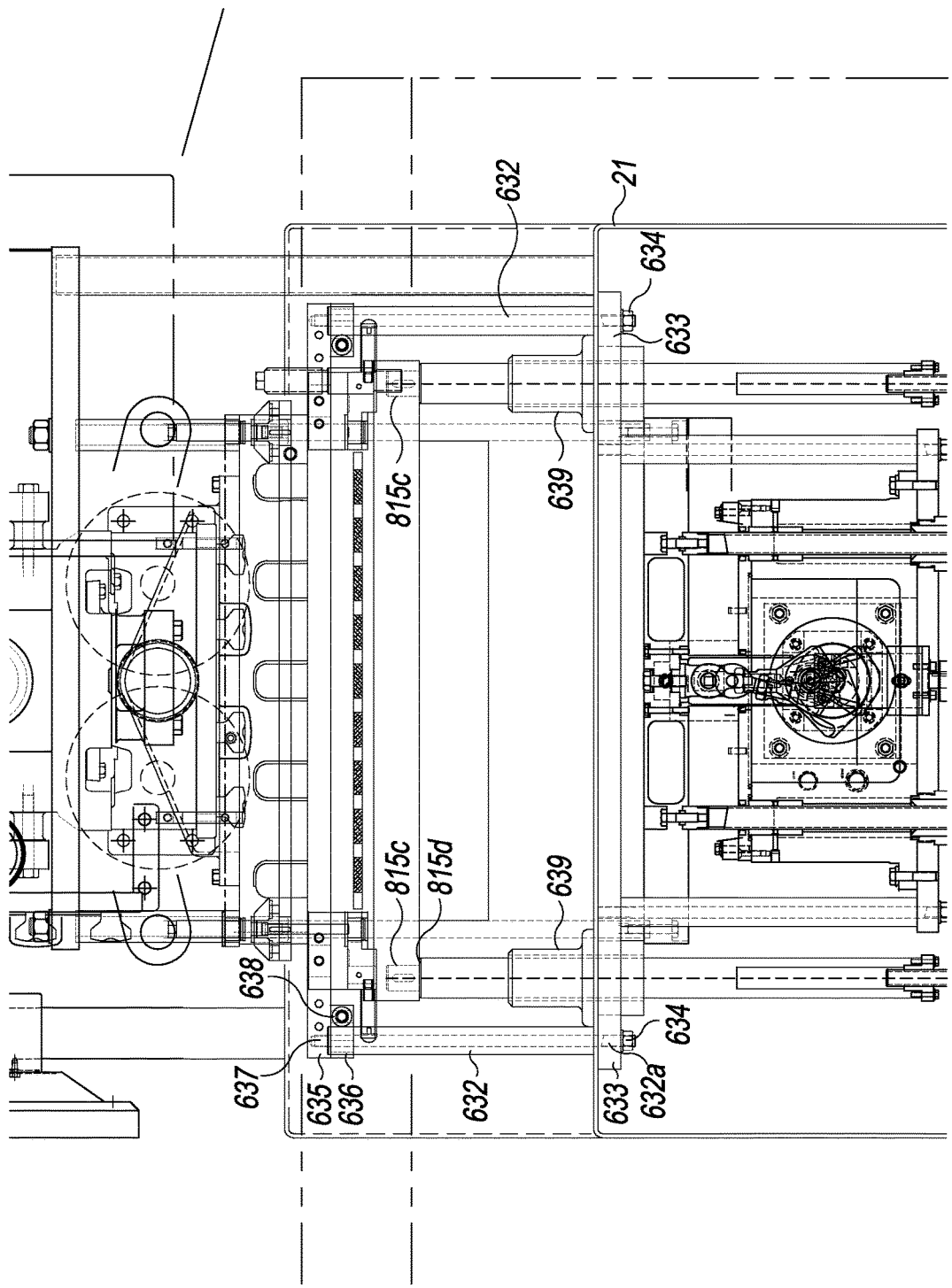
FIG. 13B is a second top view of the machine of FIG. 1 with certain components not shown.

To move the pump 330 from the working position to the maintenance position, the output passage 316 is disconnected from the outlet 338 of the pump 330 the intake passage 310 is disconnected from the flange 337 of the inlet 334 of the pump 330, a lock mechanism (not shown) on the trunnion mount system 600 is released and the pump 330 is rotated about an axis of rotation 610a of the trunnion system 600. As shown in FIG. 13a, the motor 350 rotates in direction D and the pump outlet 338 rotates in direction E about the axis of rotation 610a to bring the pump 330 and motor 350 to the maintenance position. The axis of rotation 610a is co-axial with the cylinder 620. The locking mechanism of the trunnion system 600 may be tightened or secured to hold the pump 330 in position. While in one embodiment the motor 350 and pump 330 are substantially parallel to the mold plate 32 when in the maintenance position, in other embodiment the motor 350 and pump 330 may be placed at any position about the axis of rotation 610a wherein the motor 350 or pump 330 do not contact or impact other parts of the machine, such as the mold plate 32 or mold plate drive portion. However, if portions of the mold pate or mold plate drive are removed during maintenance, then the motor 350 and pump 330 may be further rotated.

As shown in FIG. 13A, the pump output passage 316 fans out laterally in a V-shape to connect with a correspondingly wide manifold inlet 111a. The pump output passage 316 is secured to the manifold inlet 111a by bolts 318 or stud and nut combinations.

The rotary pump is shown in detail in FIGS. 14A-16. In one embodiment, the pump rotary pump is a Universal I Series Positive Displacement Rotary Pump, model number 224-UI with a rectangular outlet flange manufactured by Waukesha Cherry-Burrell, with a place of business in Delavan, Wis., and affiliated with SPX Flow Technology. A positive displacement pump causes a food material to move by trapping a fixed amount of it then forcing that trapped volume into the discharge opening or pipe.

Figure 15:
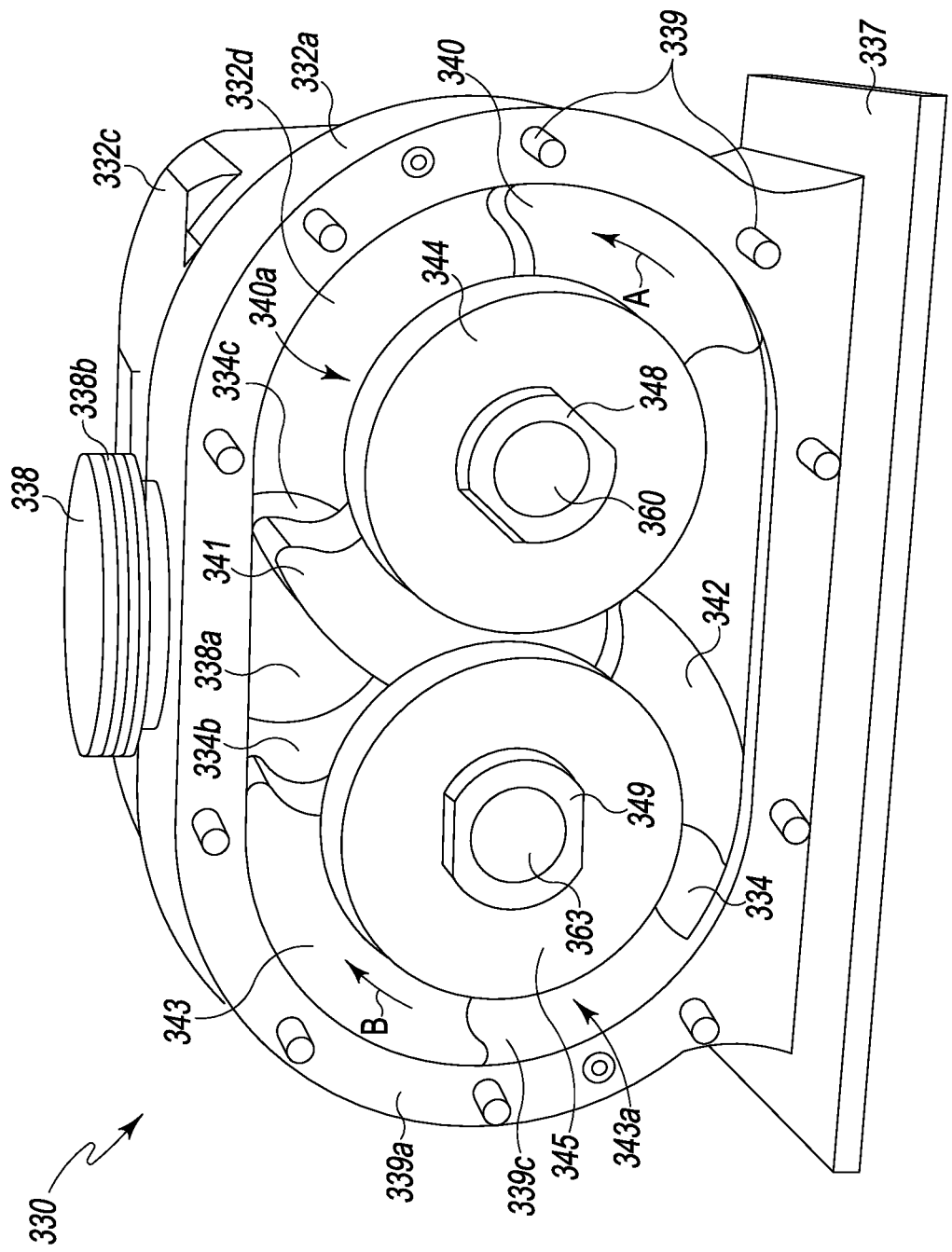
FIG. 15 is a top side view of the rotary pump with the face plate removed.
Figure 16:
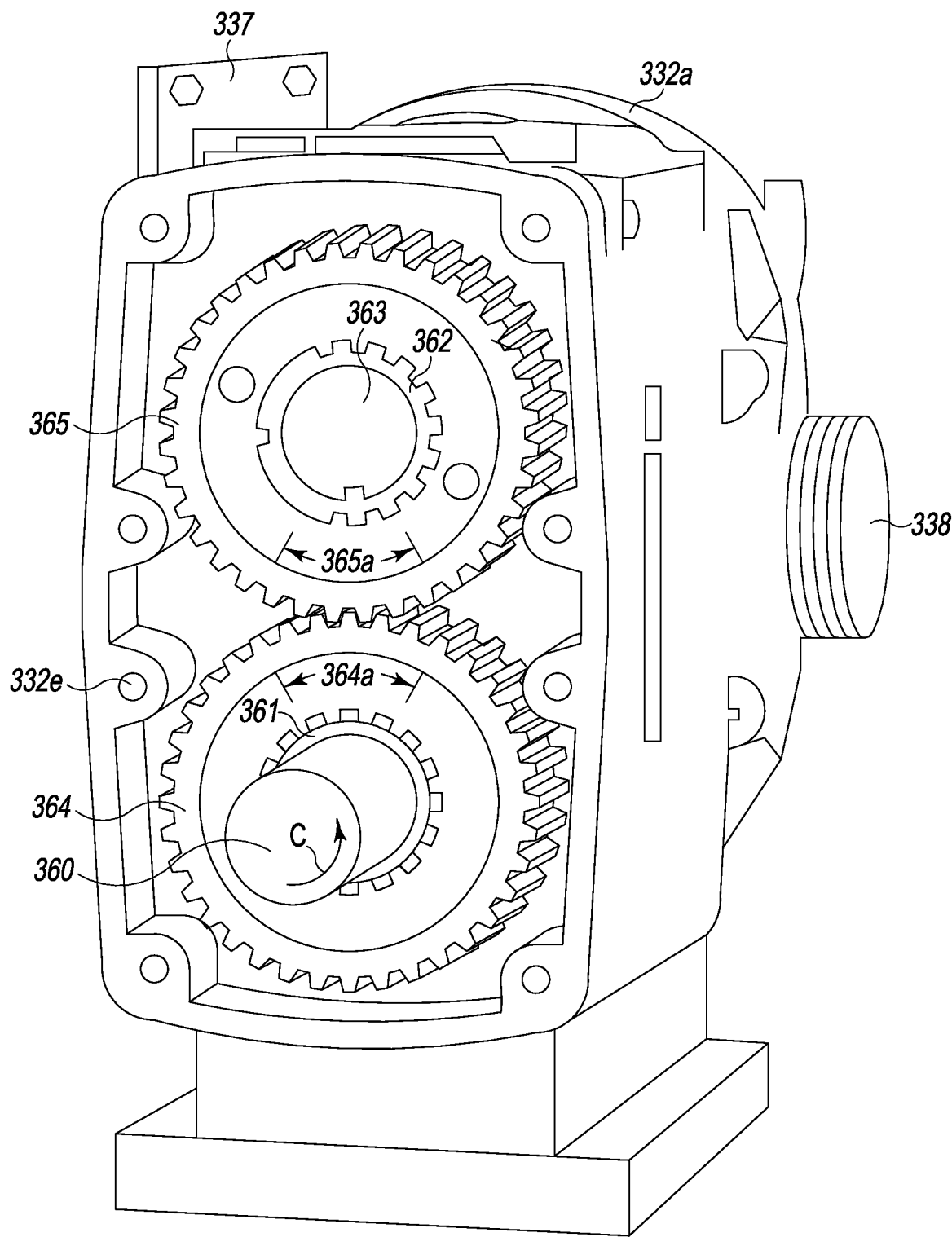
FIG. 16 is a bottom side view of the rotary pump with the back plate removed.

As shown in FIG. 15, the pump 330 has a housing with a pump area 332a and a gear area 332c. The pump has an inlet 334 and an outlet 338 in communication with the pump area 332a. The pump area is separated from the gear area by a wall 332d. A portion of the gear area is shown in FIG. 16 were the back cover plate is removed. A drive gear 364 and a driven gear 365 are meshed across a meshed arch of each gear 356a, 364a. The drive gear is keyed to rotate in sync with the drive shaft 360 at a first end of the drive shaft. The drive gear has a locking nut and lock washer 361 that assists in securing the gear to the drive shaft.

The driven gear is keyed to rotate the driven shaft 363. The driven shaft has a locking nut and lock washer 361 that assists in securing the gear to the driven shaft at a first end of the drive shaft. The driven and drive shafts are journal through a support structure (not shown) in the housing to carry rotors 340a, 343a at second ends of the driven and drive shafts opposite the first ends. The support structure (not shown) in the housing contains high capacity, double tapered roller bearings that the drive and driven shafts rotate on. The rear cover plate (not shown) contains an opening to allow the drive shaft to extend outside of the housing to engage a drive source such as the motor 350.

Figure 14A:
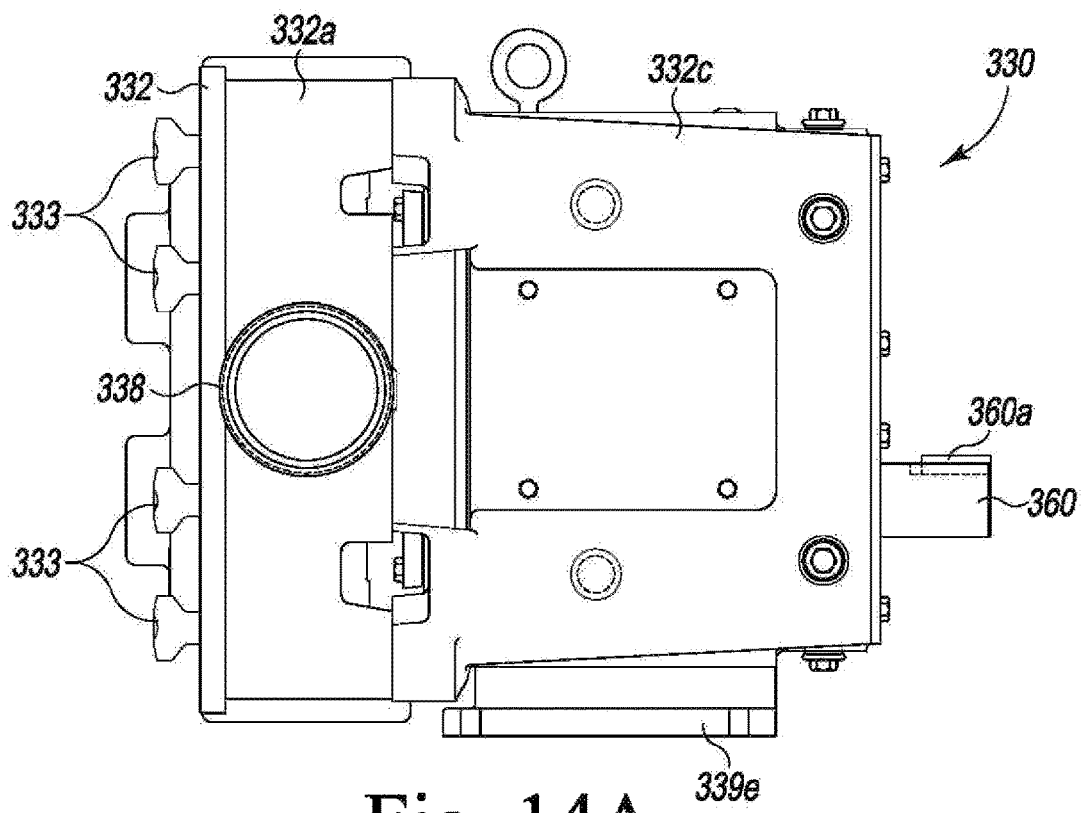
FIG. 14A is an inlet side view of the rotary food pump.
Figure 14B:
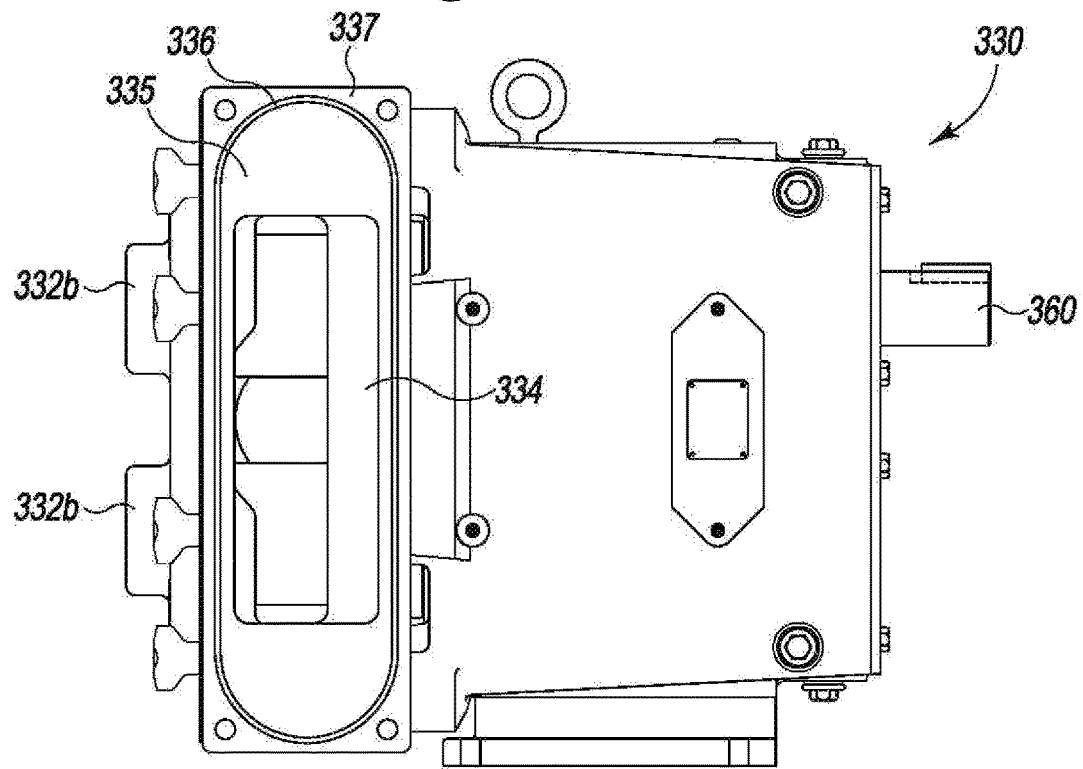
FIG. 14B is an outlet side view of the rotary food pump.
Figure 14C:
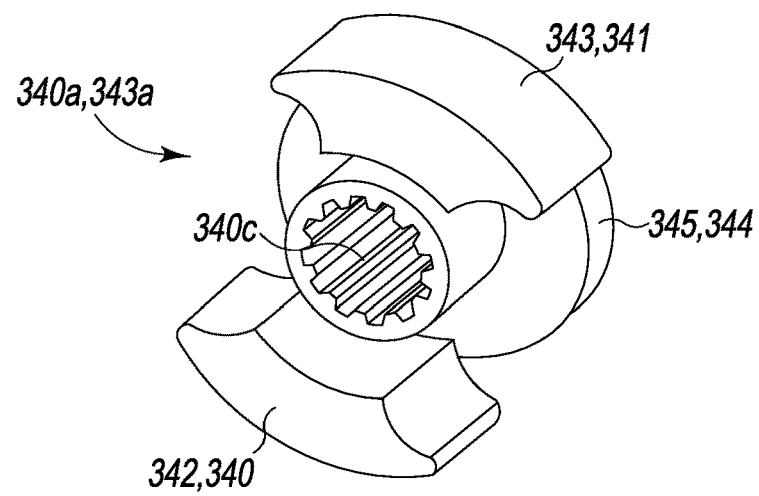
FIG. 14C is a perspective view of a rotor from the rotary food pump.
Figure 14D:
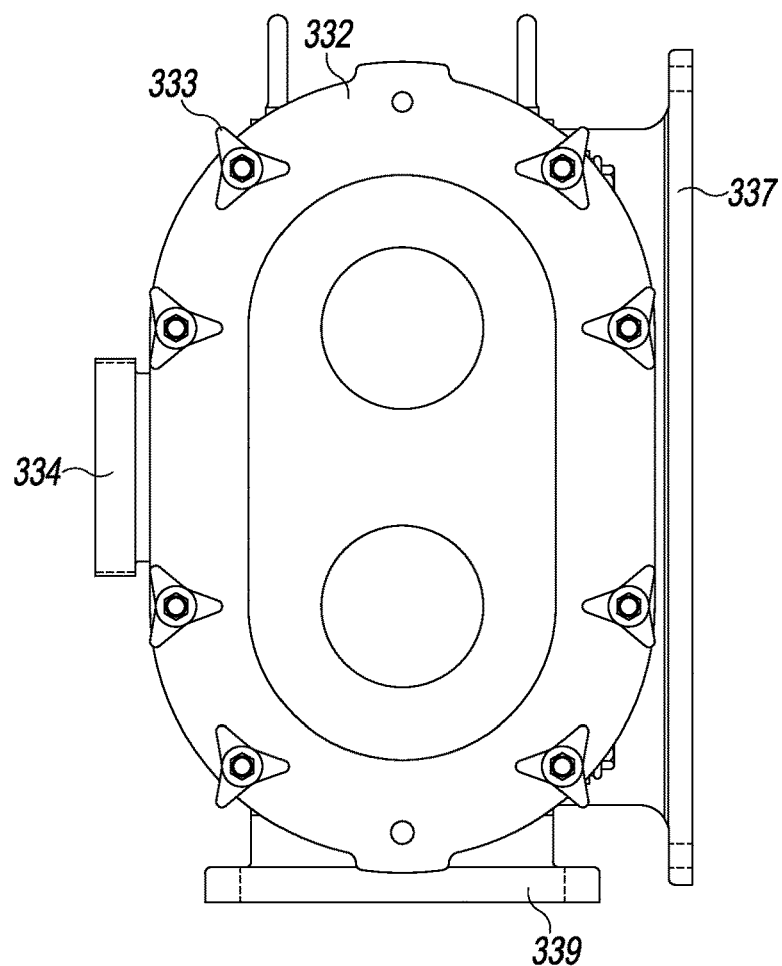
FIG. 14D is a top side view of the rotary food pump.
Figure 14E:
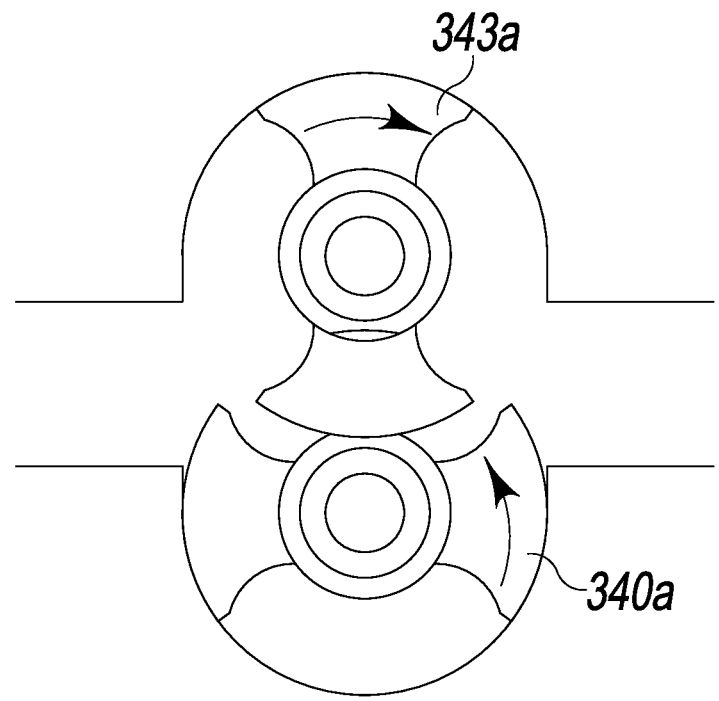
FIG. 14E is a schematic diagram of a portion of the rotary pump.
Figure 14F:
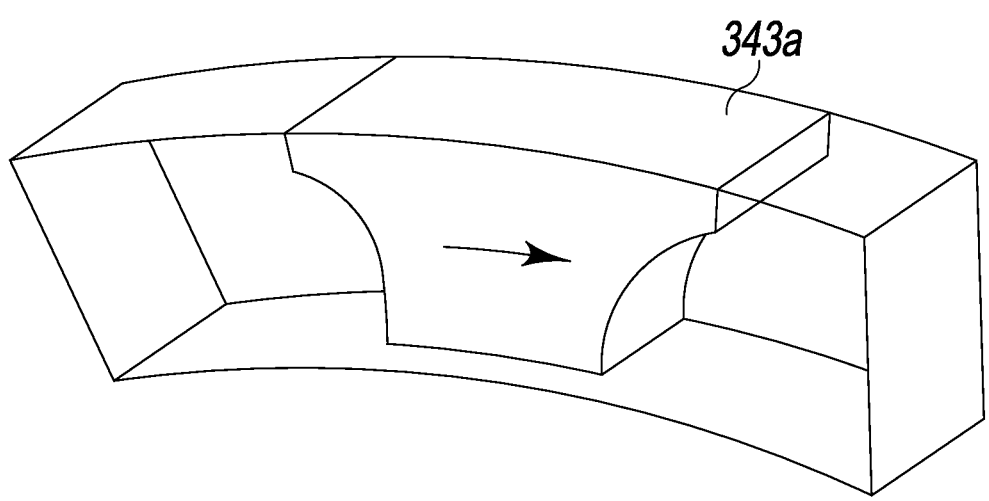
FIG. 14F is a wing of the rotor within an within an portion of it area of operation.

The second ends of the drive and driven shafts have a splined section (not shown). The rotors 340a 343a have a splined opening that mates with the splined section of the drive and driven shafts respectively. Each rotor 340a, 343a has two wings 340, 341 and 342, 343, respectively. The wings have overlapping areas of rotation as shown in FIG. 14E. Each wing is located opposite the other wing on the rotor and gaps are located between the wings about the circumference of the rotor. The wings travel in annular-shaped cylinders 339c (not labeled for rotor 340a) machined into the pump body. The rotor is placed on the shaft with a plate portion 344, 345 outwardly facing. Nuts 348, 349 are screwed on a threaded end portion of the shafts to secure the rotor in place. The rotors have a close fit clearance between the outer surface of the wing 343a and the corresponding cylinder wall faces 339c of the pump area. As shown in FIG. 14E, the wing of one rotor will be located in the open area of the other rotor during a portion of an operation cycle. An operation cycle comprises a full 360 degree rotation of a rotor.

The splined mating of the rotors and shafts ensure that the rotors rotate in sync with the respective drive and driven shafts. The rotors are interference fitted in the pump area as shown by their overlapping areas of rotation. The meshed gearing 356a, 364a prevents the rotors from contacting each other during operation.

When the drive shaft 360 is rotated in direction C shown in FIG. 16, the drive shaft rotate the first rotor in the same direction, direction A in FIG. 15. Simultaneously, as provided by the meshed gearing 364, 365 the second rotor is rotated in the opposite direction, as shown by direction B in FIG. 15, of that of the first rotor.

The vacuum created by the rotation of the rotors 340a, 343a captures and draws food product in to an inlet 334, through the pump and the outlet passage 338a, and out the outlet 338. The outlet may have threads 338b on the outside of the outlet as shown in FIG. 15.

The pump area 332a face 339a is covered to enclose the pump area by a face plate 332. The face plate has raised areas 332a, 332b for accommodating space required for the shaft ends and the corresponding nuts 348, 349. The face has a plurality of holes corresponding to the studs 339 that extend from the face 339a. Face plate wing nuts 333 secure the face plate to the face 339a.

The outlet 338 is a circular outlet and the inlet 334 is an oblong with a rectangular flange 337. The rectangular flange 337 has an oval seal or gasket 336 surrounding the oblong inlet.

The outlet 334 connects pump output passage 316. The output passage 316 includes an expanding-V section 316a that connects with the manifold inlet 111a. The output passage 316 connected to the manifold 27 with a lower hinge 318. When the output passage is connected to the rotary pump 330 and the output passage is in the deployed position, a flange 317 of the output passage is flush with the face 319 of the manifold at the inlet passage 111. When the output passage is disconnected from the rotary pump and in a lowered position 326, the flange and output passage pivots downward and away from the inlet passage about the lower hinge 318.

Figure 17:
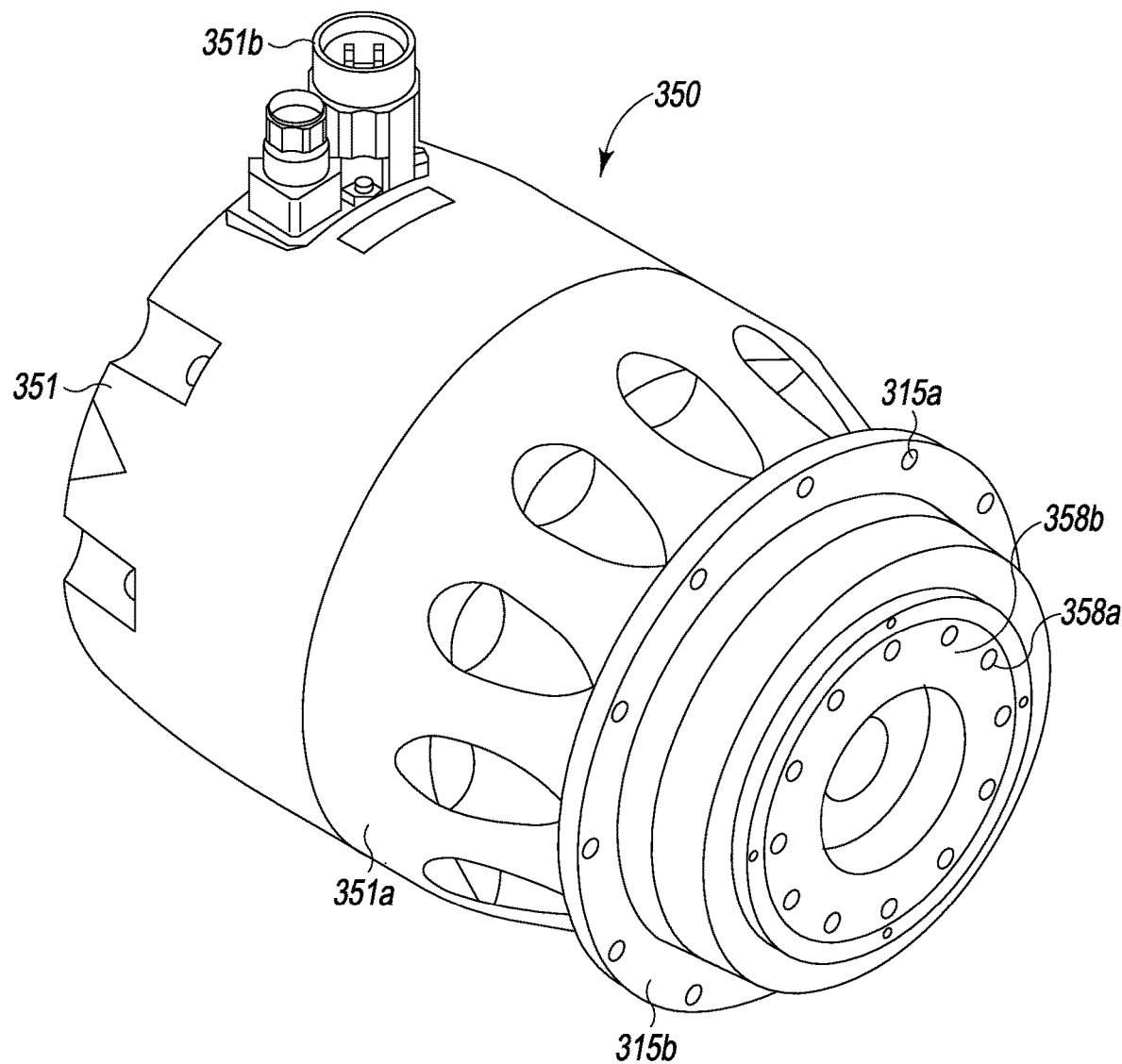
FIG. 17 is a perspective view of a rotary pump motor.

The pump 330 is driven by the pump motor 350. The motor is shown in FIG. 17. In one embodiment, the motor 350 is a servo rotary actuator, such as the TPM+Power 110 Stage 2 series rotary actuator with brake manufactured by Wittenstein, Inc. with a place of business in Bartlett, Ill. In one embodiment, motor 350 is an electric servo rotary actuator, such as the model TPMP1105 manufactured by Wittenstein, Inc. The servo rotary actuator comprises a combined servo motor and gearbox assembly in one unit. The servo rotary actuator has a high-torque synchronous servo motor. The configuration of the servo motor and the gearbox gearing provides the actuator with a reduced length. The actuator has a helical-toothed precision planetary gearbox/gearhead for reduced noise and quiet operation. The rotary actuator has a 70:1 gearing ratio, 1180 ft./lbs. of torque, and maximum speed of 65 RPMs.

The motor 350 has a housing 351, an electrical connection 351b, a mounting face 315b, and an output coupling flange 358b. The mounting face 315b has a plurality of holes 315a. As shown in FIG. 2, the pump is secured to a mounting plate by a plurality of bolts 311a which engaged the back of the pump, such as by engaging threaded holes 332e at the back of the pump. The mounting plate is secured to the machine base 21 by bolts 312. A circular mounting member 313 encloses the connection between the motor and the pump and attaches to the mounting plate 311. Alternatively, the mounting member 313 may connect directly to the machine base. The mounting member 313 connects to the motor 350 at the mounting face. A number of bolts 315 secure the motor to the mounting member. A circular coupling 356 is attached to the output coupling flange 358b by bolts 358 threaded into the correspondingly threaded holes 358a of the output coupling flange 358b. At an opposite end, the coupling 356 receives the drive shaft 360 in an opening of the coupling 356. The drive shaft 360 has a key 360a that engages a corresponding slot of the opening of the coupling 356 to lock the machine 100 to the drive shaft of the pump. The motor is angled to align with the output shaft of the pump.

Molding Mechanism

As shown in FIGS. 1, 2, 9-13B, the lower surface of the housing 71 that encloses the manifold 27 is positioned over a fill plate 121a that forms a flat, smooth mold plate support surface. The fill plate may be surrounded longitudinally by a guide plate (not shown) so that the fill plate is modular within the guide plate and thereby the fill plate can be quickly and easily changed. The mold top plate 121 and the fill plate 121a may be fabricated as two plates or a single plate bolted to or otherwise fixedly mounted to the housing 71.

The housing 71, manifold 27, top plate 121, fill plate 121a, and trunnion system 600 are supported by a plate 635. The plate 635 may be integrated with the housing 71, so that the plate 635 and housing 71 are one unitary piece. The plate 635 is connected to four towers 632 that are supported on the machine base 21. A stud 632a extends from the bottom of the tower 632 into a hole in a machine base frame plate or beam 633. A nut 634 is threaded on the stud 632a on the opposite side of the beam 633. The tower 632 has a second stud 637 that extends from the upper portion of the beam 633 to be received into a hole of the plate 635. On the lower side of the plate 635 is a collar 636 that is secured around the top of the tower 632. The collar 636 is tightenable by a tightening mechanism, such as a screw or bolt and nut combination.

The fill plate 121a may include includes apertures or slots 121e that form a lower portion of the manifold 27. In one embodiment, the apertures or slots 121e comprise additional smaller second fill apertures or slots 121b such as those disclosed in U.S. Pat. No. 7,255,554, which is hereby incorporated by references to the extent not inconsistent with the present description. The slots 121b are shown for one of the slots 121e in FIG. 9, but it is understood that the each slot 121e may comprise slots such as 121e.

Mold plate 32 is supported upon a bottom plate 122. Mold plate 32 includes a plurality of individual mold cavities 126 extending across the width of the mold plate and alignable with the manifold outlet passageways 111c. The mold plate may have a single row of cavities or may have plural rows of cavities, stacked in aligned columns or in staggered columns. A breather plate or bottom plate 122 is disposed immediately below mold plate 32, closing off the bottom of each of the mold cavities 126. The bottom plate 122 is mounted on a mold base plate 123. In one embodiment, the spacing between bottom plate 122 and fill plate 121a is maintained equal to the thickness of mold plate 32 by support spacers (not shown) mounted upon bottom plate 122.

The bottom plate 122 provides breather holes 216 and an associated air channel 122a flow connected to the breather holes for allowing the expulsion of air during filling of the mold cavities 126, 126. The breather holes 216 are minute air outlet holes formed in the bottom plate, in the part of the bottom plate adjacent fill slots 121e. As the food product is pumped into mold cavities 126, it displaces the air in the mold cavities. The air is forced outwardly through the breather holes 216 and the channel 122a, escaping through the channel 122b and upward air channel 122c. Upward air channel 122c and channel 122b may each be connected to conduits 3010 and 3020 respectively which routes any food product back into the pump. Conduits receiving output from channels 122c and 122b may converge at any point prior to reaching the food pump, or may converge at the inlet to the food pump. Any food particles small enough to pass through the breather holes 216 follow this same path back into the pump. Alternatively, food particles may pass in a similar manner back to the food product hopper. The air channel 122a, 122b is connected to an upward air channel 122c that may be connected to the hopper by a suitable conduit (not shown) or connected to the pump 330 intake by a suitable conduit, such as a pipe 3000a, 3000b, 3000c, 3000d (FIGS. 24a-24d), to recycle food product that might be expelled with the air into the air channel. The pump may have a low pressure on the intake side which create vacuum to draw air through from the cavity and through the air channel 122a, 122b, 122c.

In another embodiment, the breather plate 122 and breather holes 216 may be configured as disclosed in U.S. Pat. Nos. 6,416,314 or 7,416,753, which are hereby incorporated by reference to the extent not inconsistent with the present description. As recognized by one skilled in the art, the breather plate of U.S. Pat. Nos. 6,416,314 or 7,416,753 would need to be inverted to operate in a top fill machine of the present application.

As best illustrated in FIGS. 3, 4A, and 5 mold plate 32 is connected to drive rods 128 alongside the housing 71 and are connected at one end to a transverse bar 129. The mold plate drive system 500 comprises the drive rods 128, the mold plate drive motors 138, 138d and the associated linkages. The bar 129 is connected to the mold plate by two connecting links 129a. The connecting links are secured to the bar 129 by two bolts 129b and the links 192a are connected to the mold plate by at least one bolt 192c.

The other end of each drive rod 128 is pivotally connected to a connecting link 131 via a machine 100 plate 131a and a pivot connection 131c, shown in FIG. 5. The pivot connection 131c can include a bearing (not visible in the figures) surrounding a pin within an apertured end of the connecting link 131. The pin includes a cap, or carries a threaded nut, on each opposite end to secure the crank arm to the machine 100 plate 131a.

Each drive rod 128 is carried within a guide tube 132a having bearings that is fixed between a wall 134 and a rear support 132b. The connecting links 131 are each pivotally connected to a crank arm 142 via a pin 141 that is journaled by a bearing 141a that is fit within an end portion of the connecting link 131. The pin crank arm 142 is fixed to, and rotates with, a circular horizontal guard plate 135. The pin 141 has a cap, or carries a threaded nut, on each opposite end that axially fixes the connecting link 131 to the crank arm 142 and the circular guard plate 135. The pin 141 rotates the link on an orbit 141c about the motor output 138a. The connecting link 131 also includes a threaded portion 131b to finely adjust the connecting link length.

The crank arm 142 is driven by a precise position controlled servo mold plate drive motor 138. The motor is mounted vertically in the machine so that the output 138a rotates on a horizontal axis which is the same horizontal axis that the circular guard plate 135 rotates about. The crank arm 142 is attached to the output 138a to rotate the crank arm about the output 138a. The motor 138 is mounted to a motor support plate 138b that is mounted to and supported by the machine base 21. As shown in FIG. 7, the motor is mounted with the output 138a perpendicular to the support plate. The motor has power and control cables that are routed through a wiring conduit 138c to connect those wires to power and machine control 23. A precise position controlled servo mold plate drive motor 138d is identical to motor 138 but is mounted on the left side of the machine to drive the drive rod 128 on the left side of the machine as shown in FIG. 7. The mechanical configuration on the left side, regarding the mold plate drive motor and related connection are the same as that described for the right side above.

The machine control 23 has instructions for maintaining the two motors 138, 138d operating in sync so that each of the right and left drive rods have the same longitudinal position along their respective ranges of motion. This is necessary to ensure that both lateral sides of the mold plate are in the same longitudinal position with respect to the other and they operate in a parallel reciprocation. The mold plate is reciprocated by the synchronous output both motors 138 and 138d.

The precise position controlled motors 138, 138d can be a 6-7.5 HP totally enclosed fan cooled servo motor. The servo motor is provided with two modules: a power amplifier that drives the servo motor, and a servo controller that communicates precise position information to the machine controller 23. In one embodiment, motors 138 comprise a motor 138e driving a gearbox or gear reducer 138f by a motor driveshaft 138g as shown in FIG. 7. The motor may be model 1FK7082-7AF71 manufactured by Siemens AG capable of 3000 RPMs and 124 in/lbs of torque. The gearbox may be an in-line gear box such as, an Alpha TP+050 MP manufactured by Wittenstein, Inc. with a place of business in Bartlett, Ill.

The controller 23 and the servo motors 138, 138d are preferably configured such that the servo motor rotates in an opposite rotary direction every cycle, i.e., clockwise during one cycle, counterclockwise the next cycle, clockwise the next cycle, etc.

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached connecting links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

FIG. 5 illustrates a proximity sensor 144 in communication with the machine control 23. A target 144a is clamped onto output shaft 138a of the gear box 138f. The proximity sensor 144 communicates to the controller 23 that the crank arm 142 is at a particular rotary position corresponding to the mold plate 32 being at a pre-selected position. Preferably, the proximity sensor 144 can be arranged to signal to the controller that the crank arm 142 is in the most forward position, corresponding to the mold plate 32 being in the knockout position. The signal confirms to the controller that the knockout cups 33 can be safely lowered to discharge patties, without interfering with the mold plate 32.

Figure 9:
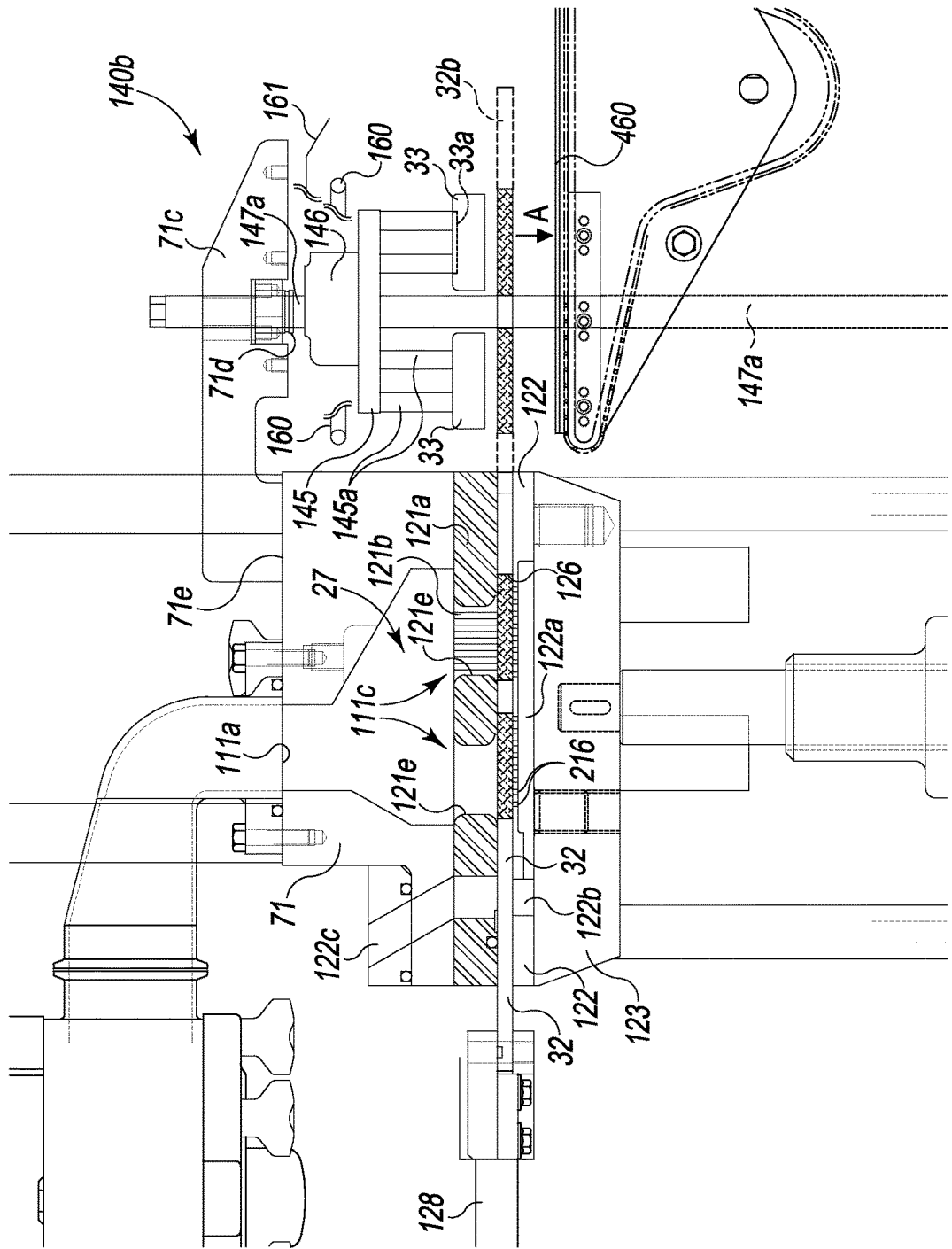
FIG. 9 is a side view of a portion of the molding mechanism.

During a molding operation, the molding mechanism 28 is assembled as shown in FIGS. 2 and 9, with bottom plate 122 tightly clamped onto spacers (not shown).

In each cycle of operation, knockout cups 33 are first withdrawn to the elevated position as shown in FIG. 9. The drive for mold plate 32 then slides the mold plate from the full extended position to the mold filling position with the mold cavities 126 aligned with passageway 111c.

During most of each cycle of operation of mold plate 32, the knockout mechanism remains in the elevated position, shown in FIG. 9, with knockout cups 33 clear of mold plate 32. When mold plate 32 reaches its extended discharge position 32b, the knockout cups 33 are driven downward in direction A to discharge the patties from the mold cavities.

The discharged patties may be picked up by the conveyor 460 or may be accumulated in a stacker. If desired, the discharged patties may be interleaved with paper, by an appropriate paper interleaving device. Such a device is disclosed in U.S. Pat. Nos. 3,952,478 or 7,159,372, both incorporated herein by reference to the extent not inconsistent with the present description. In fact, machine 100 may be used with a wide variety of secondary equipment, including steak folders, bird rollers, and other such equipment.

By using a servo motor to drive the mold plate, the mold plate motion can be precisely controlled. The motion can have a fully programmable dwell, fill time, and advance and retract speeds as controlled by the machine control 23.

Mold Base Lift Mechanism

During mold plate change or to clean the apparatus, it is necessary to lower the mold base plate 123 from above the mold plate 32 and the fill plate 121a. The collars 636 are loosened as a first step for lowering the mold base plate 123.

A mold base lift mechanism 800 is mounted inside the machine base 21 and extends upward to mold base 123. The lift mechanism includes two jacks 802, 804 shown in FIG. 3A. The jacks are operatively connected to right angle drives 808, 810, which are operatively connected to a T type right angle drive 814, via drive shafts 818, 820 and respective couplings 823, 824, 826, 828, 830. The right angle drive 814 is driven into rotation by a motor 836.

The jack 802 is described below with the understanding that the jack 804 is identically configured and functions identically, in tandem, as the jack 802.

As shown in FIG. 3A the drive 808 turns a threaded rod or jackscrew 842 that drives a nut drive assembly 844 vertically. The jack screw 872 is journaled for rotation at a top end by a guide 845. The jack screw 842 can include a bearing therebetween for smooth journaled rotation of the jackscrew. The drive assembly 844 is operatively connected to a lift column 850 via a bracket 851 which is aligned over the jackscrew. The lift column has an opening 851a. The bracket is connected at the column on each side of the opening at the bottom of the column. Thereby the bracket and the jackscrew are received in a portion of the opening 815a. The columns 850 of the jacks 802, 804, have keys 815c extending from the tops of the columns. The keys engage corresponding slots of the mold base and the mold base rest on top surfaces 815d of the columns. In one embodiment, the columns 850 are hollow and can also serve as wire and tube conduits. The columns 850 are journaled through frame plate 633 and guides 639. Bearings may be included within the journaled areas to reduce friction from contact between the columns and the frame plate.

A sensor 908 is mounted on or adjacent to the lift mechanism for signaling to the machine control the position of the jacks. In one embodiment, the jacks have a corresponding reading strip on the surface 804a of the jacks that the sensor reads to provide a jack location signal to the machine control. The machine control may be programmed to prevent operation of the machine when jacks are in a predetermined position, such as a lowered position. Further a proximity sensor (not shown) is mounted at an elevated position within the machine base along the vertical path of the target (not shown) mounted to the jacks and signals a pre-determined raised maximum height or depth of the mold base for a mold plate change out procedure. The proximity sensor signals the machine controller to stop the motor 836 at that point.

In another embodiment, the lift mechanism 800 may be that disclosed in U.S. Pat. No. 7,229,277, which is herein incorporated by reference to the extent not inconsistent with the present description.

Knockout Mechanism

Molding mechanism 28 further comprises a knockout mechanism or apparatus 140 shown in FIGS. 2, 9-12. The knockout apparatus comprises the knockout plungers or cups 33, which are fixed to a carrier bar 145 by bars 145a. Knockout cups 33 are coordinated in number and size to the mold cavities 126 in the mold plate 32. One knockout cup 33 is aligned with each mold cavity 126. The mold cavity size is somewhat greater than the size of an individual knockout cup.

The knockout apparatus 140 is configured to drive the carrier bar 145 in timed vertical reciprocation. The knockout apparatus includes a knockout drive mechanism 140a, a knockout cup system 140b. The knockout drive mechanism is positioned below the mold plate and at least partially enclosed in the machine base 21. The knockout cup system 140b is located about the mold plate during at least a portion of any knockout cycle. The knockout shaft connects 147a the knockout drive to the knockout cup system and may be considered a part of either.

FIGS. 9-12 illustrate the knockout apparatus 140 in more detail. The carrier bar 145 is fastened to knockout support brackets 146a, 146b. The knockout support brackets 146a, 146b are carried by two knockout rods 147. Each knockout rod 147 is disposed within a wall of a knockout housing 148 and is connected to a knockout beam 149. The knockout beam 149 is pivotally mounted to a crank rod 151 that is pivotally connected to a fastener pin 156 that is eccentrically connected to a crank hub 155 that is driven by a knock out cup drive motor 157.

The motor 157 is preferably a precise position controlled motor, such as a servo motor. An exemplary servomotor for this application is a 3000 RPM, 2.6 kW servo motor provided with a brake, such as a permanent-magnet synchronous servo motor made by Siemens AG having a model number of 1FK7064-7AF71-1GB0. The servo motor is provided with two modules: a power amplifier that drives the servo motor, and a servo controller that communicates precise position information to the machine controller 23.

The controller 23 and the motor 157 are preferably configured such that the motor rotates in an opposite direction every cycle, i.e., clockwise during one cycle, counter-clockwise the next cycle, clockwise the next cycle, etc.

A heating element 160 surrounds, and is slightly elevated from the knockout carrier bar 145. A reflector 161 is mounted above the heating element 160. The heating element heats the knock out cups to a pre-selected temperature, which assists in preventing food product from sticking to the knock out cups. The heating element 160 can be configured as disclosed in U.S. Ser. No. 13/187,426 filed on Jul. 20, 2011, and herein incorporated by reference to the extent not inconsistent with the present disclosure.

Figure 10:
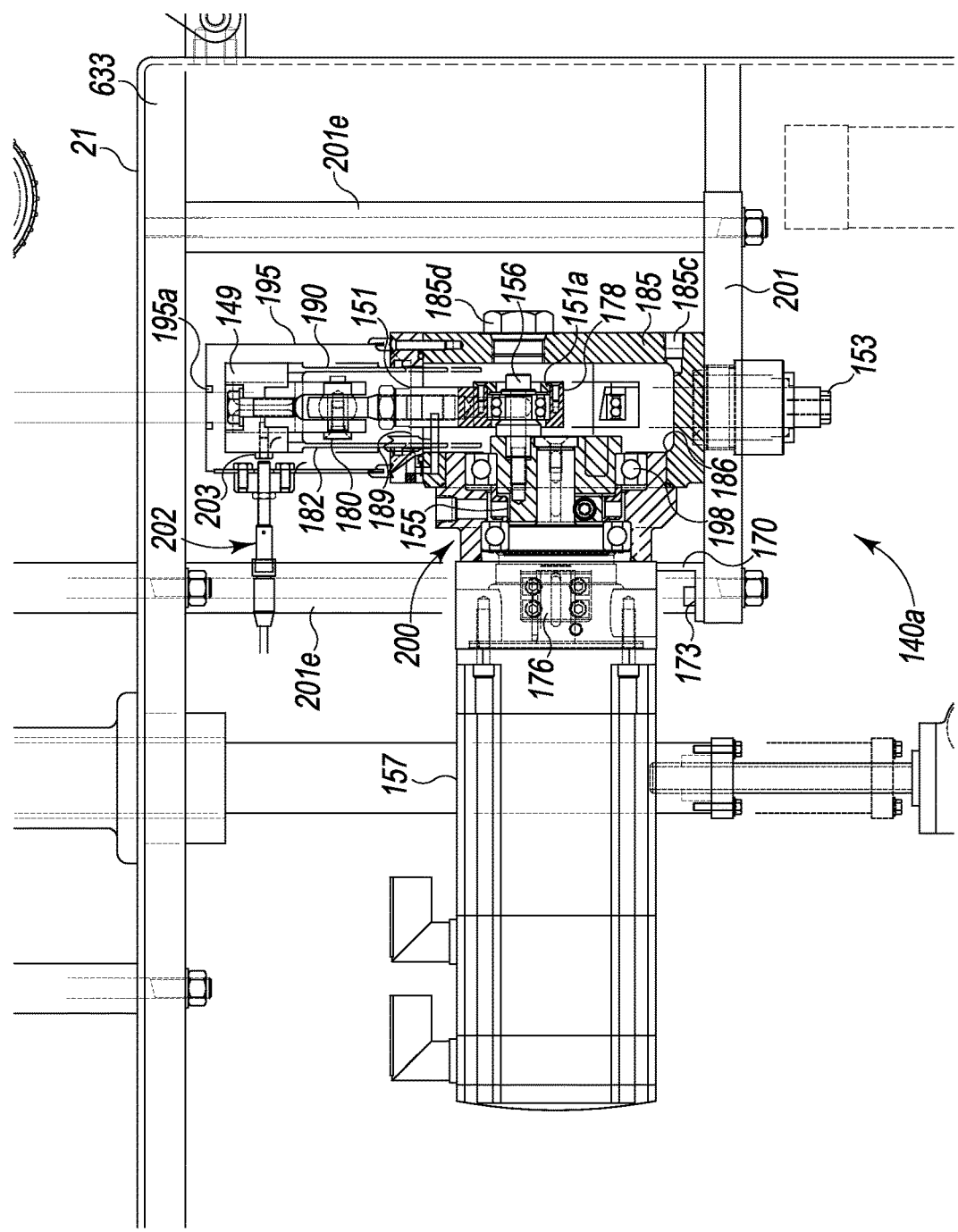
FIG. 10 is a side view of a portion of the knockout mechanism.
Figure 11:
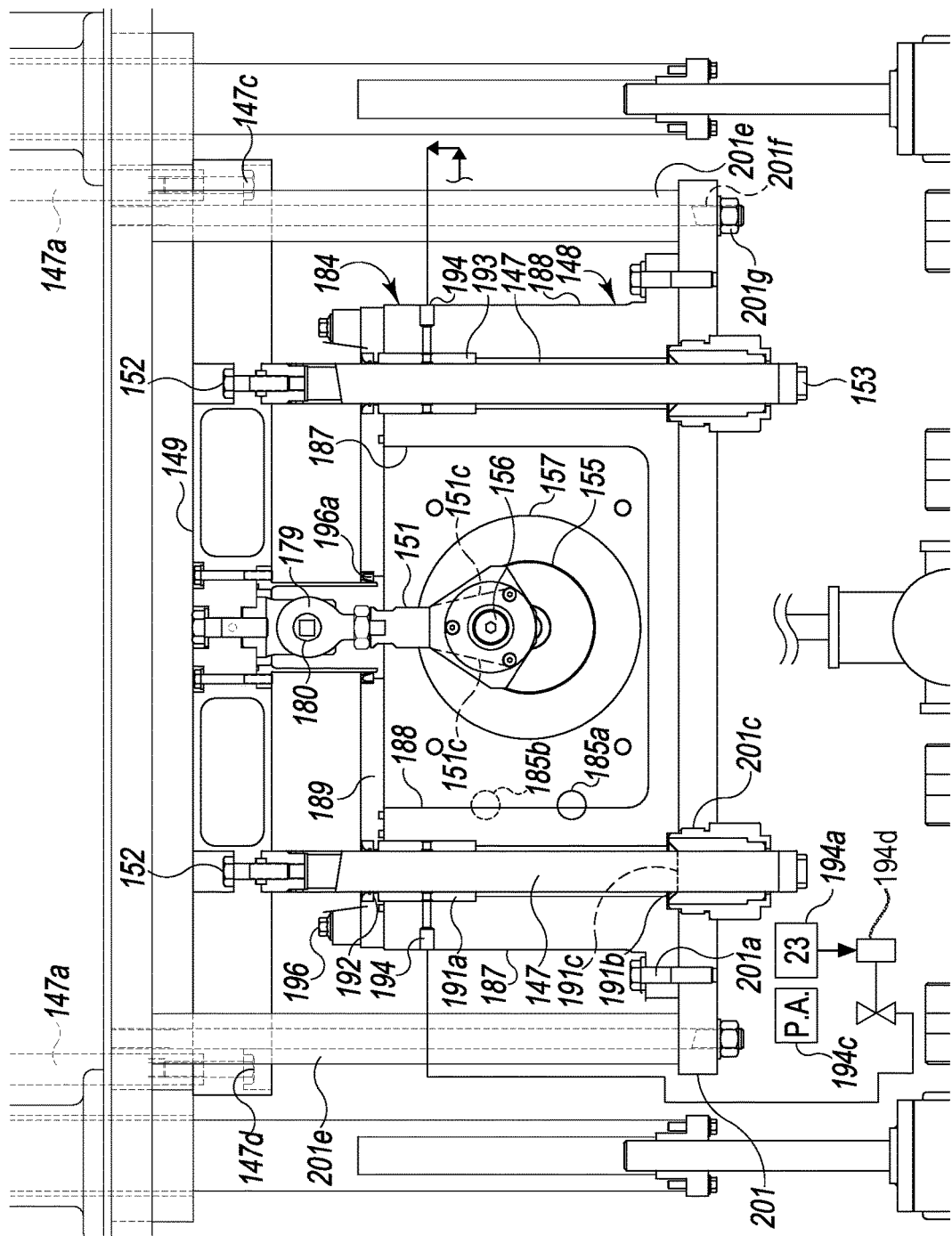
FIG. 11 is a front view of a portion of the knockout mechanism taken from FIG. 3A.
Figure 12:
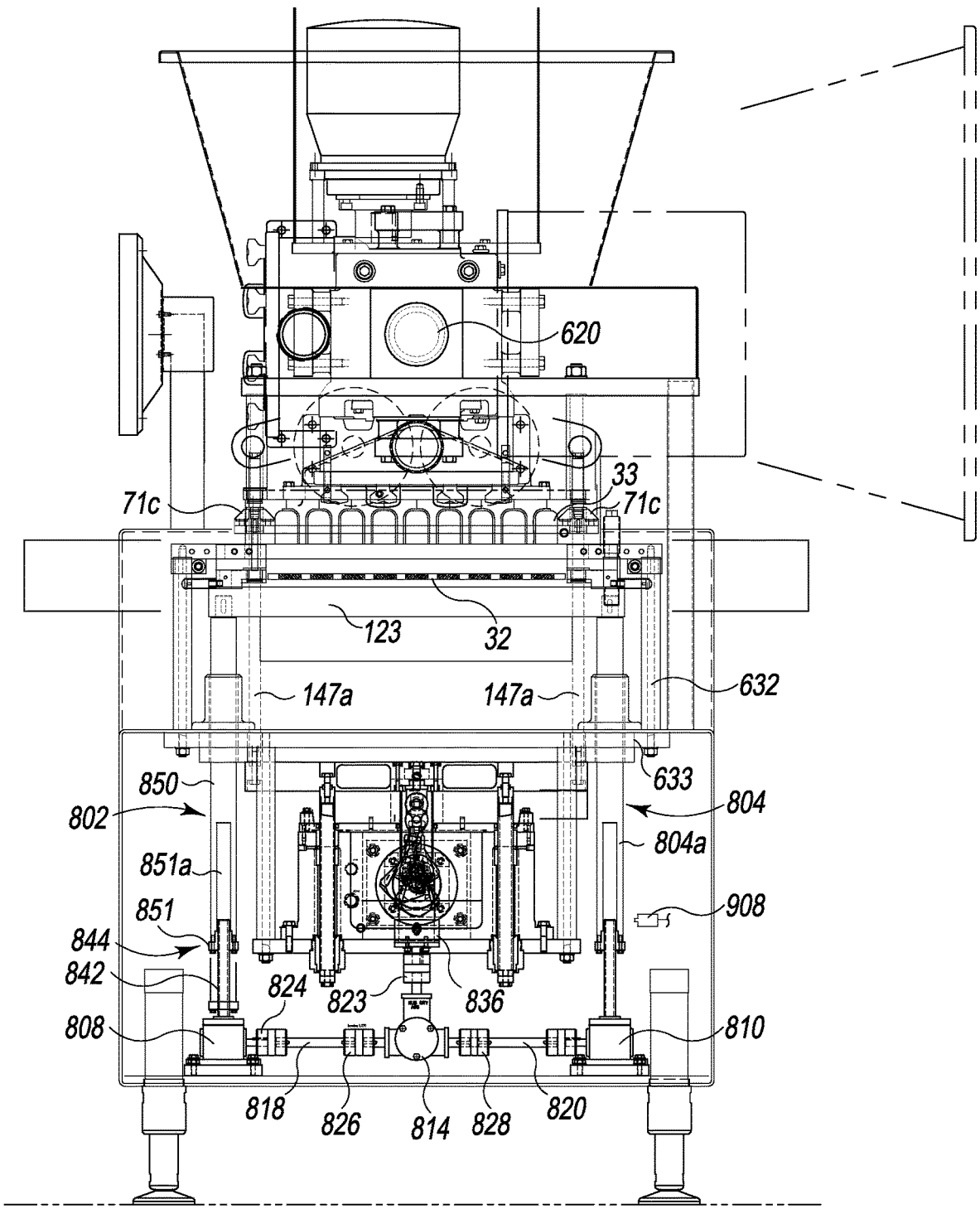
FIG. 12 is a front view of the machine of FIG. 1.

In FIGS. 10 and 11, the crank hub 155 is rotated into a position wherein the crank rod 151 is vertically oriented and the knockout beam 149 is lifted to its maximum elevation. The knockout rods are fastened to the knockout beam 149 by fasteners 152. The knockout support bracket(s) 146 are in turn fastened to the knockout shafts 147a by fasteners (not shown). The knockout shafts 147a are connected to the knockout beam 149 by fasteners such as bolts 147c, 147d. The knockout shafts are connected to the knockout beam at positions outside of those where the knockout rods 147 are attached as shown in FIG. 11.

An air flap or air check valve 33a can be provided within each cup to assist in dispensing of a meat patty from the knockout cup 33.

As shown in FIG. 10, the motor 157 is supported by a bracket 170 from a support plate 201. The bracket 170 includes one or more slotted holes, elongated in the longitudinal direction (not shown). One or more fasteners 173 penetrate each slotted hole and adjustably fix the motor 157 to the frame member. The motor 157 includes an output shaft 176 that is keyed to a base end of the crank hub 155. The fastener pin 156 retains a roller bearing 178 thereon to provide a low friction rotary connection between an annular base end 151a of the crank rod 151 and the pin 156.

The crank rod 151 has an apertured end portion 179 on an upper distal end 151b opposite the base end 151a. The apertured end portion 179 is held by a fastener pin assembly 180 through its aperture to a yoke 182. The yoke 182 is fastened to the knockout beam 149 using fasteners. The fastener pin assembly 180 can include a roller or sleeve bearing (not shown) in like fashion as that used with the fastener pin 156 to provide a reduced friction pivot connection.

The housing 148 is a substantially sealed housing that provides an oil bath. Preferably, the housing walls and floor is formed as a cast aluminum part. The crank hub 155, the pin 156, roller bearing 178, the apertured end portion 179, the fastener pin 180 and the yoke 182 are all contained within the oil bath having an oil level 183. The limits of the oil bath are defined by a housing 184 having a front wall 185, a rear wall 186, side walls 187, 188, a top wall 189 and a sleeve 190. The sleeve 190 is a square tube that surrounds a substantial portion of the crank rod 151 and is sealed around its perimeter to the top wall 189 by a seal element 196a. The sleeve 190 is connected to the beam 149 and penetrates below the top wall 189. As the yoke 182 reciprocates vertically, the beam 149 and the sleeve 190 reciprocate vertically, the sleeve 190 maintaining a sealed integrity of the oil bath. The apertured end portion 179 connects to the knockout beam 149 at the center of the knockout beam.

The crank rod 151 includes side dished areas 151c that act to scoop and propel oil upward during rotation of the hub 155 to lubricate the pin 180 and surrounding areas.

The knockout rods 147 are guided to reciprocate through the side walls 187, 188, particularly, through upper and lower bearings 191a, 191b. The rods 147 are sealed to the top wall by seals 192. The bearings 191a can include an internal groove 193 that is in flow-communication with a lubricant supply through port 194.

A lubricant system 194a is provided to provide lubricant to the bearings 191a, 191b. The system 194a includes a lubricant reservoir 194b that is filled with lubricant, such as oil, and connected to plant air 194c via an electronically controlled valve 194d. The machine controller 23 periodically, according to a preset routine, actuates the valve 194d to propel some lubricant into the bearings 191a. Lubricant can run down the knockout rod 147 into a dished top 191c of the lower bearings 191b to allow oil to penetrate between the knockout rods 147 and the lower bearings 191b.

As shown in FIG. 10, an outer cover 195 is fastened and sealed around the side walls 187, 188 and front and rear walls 185, 186 by fasteners, spacers 196 and a seal 197. Any lubricating oil that passes through the seal can be returned to the oil bath via dished out drain areas and drain ports through the top wall.

The front wall 185 includes an oil level sight glass 185a, a fill port 185b (shown dashed in FIG. 10), a drain port 185c (FIG. 11); and an access hole closed by a screw 185d (FIG. 11).

The crank hub 155 is journaled for rotation by two roller bearings 198, 199. The roller bearings 198, 199 are supported by a collar assembly 200 bolted to the rear wall 186 and to the motor 157.

The knockout assembly is changeable to extend further forwardly to minimize knockout cup cantilever. This is accomplished by loosening the bracket 170 from the frame member 172 and sliding the motor and all the connected parts forward or rearward and replacing circular adapter plates for the knockout rods 147.

The housing 148 is fastened to a support plate 201 by fasteners 201a. The support plate 201 has holes 201c that surround the bearings 191b and associated bearing assemblies 191c. The support plate 201 is connected to the machine base frame plate or beam 633 of the base 21, by four upward extending support members 201e. The support members 201e have threaded studs 201f that extend downward through corresponding holes in the support plate 201. Nuts 201g are secured to the corresponding studs 201f to secure the support plate 201 to the support members 201e. The support members connect to the support plate 201 at or about the four corners of the support plate.

In one embodiment there are two knockout shafts 147a. The knockout shafts are journaled through a guide 71c. The guide is attached to the top 71e of the manifold 27 as shown in FIGS. 2 and 9. The guide has openings or bearing guides 71d that the knockout shafts 147a are journaled through. The openings 71d may contain bearings (not shown). The knockout shafts 147a extend through openings in the carrier bar 145.

The knockout shafts extend upwards through the machine base. The knockout shafts extend on either side of the mold plate 32 in the lateral direction as shown in FIG. 3A. Therefore, the mold plate 32 is positioned in between the knockout shafts 147a when the mold plate cavities are aligned with the knockout cups.

The knockout assembly is changeable to extend further forwardly to minimize knockout cup cantilever and stress in supporting members. This is accomplished by loosening the bracket 170 from the frame member 172 and sliding the motor 157 and the connected parts forward or rearward and replacing the circular adapter plates that guide the knockout rods 147. The guide is also adjustable in its connection to the 71 manifold to slidably move the guide forward or backward within a range longitudinally to adjust the location of the knockout cups in concert with the adjustment of the knockout drive mechanism 140a.

A proximity sensor 202 is bolted to the outer cover 195, and a target 203 is provided on the crank bar 149 to be sensed by the proximity sensor 202. The proximity sensor 202 communicates to the controller 23 that the knockout cups are raised and the mold plate can be retracted without interfering with the knockout cups.

The movement of the knockout cups is fully programmable for different motion profiles, including dwell, accelerations and extend and retract speeds. Such motion profiles may be useful depending on the properties of the food product to be discharged from the mold plate cavities. Because both the mold plate and the knockout cups can be driven by programmable, controlled servo motors, they can be flexibly sequenced without being restricted in motion by a common mechanical system.

The hopper tilt system and the touch screen control panel 601 are configured such that apparatus can be easily factory converted from a right side operating apparatus to a left side operating apparatus, that is, factory reversible across the longitudinal centerline of the apparatus.

The operation of the machine is controlled by the machine control 23. The machine control is schematically shown in FIG. 1. The machine control is signal connected to the rotary pump motor 350, the feed screw drive motors 406, 408, the mold plate drive motors 138, 138d, sensor 144, and the knock out cup drive motor 157. These connections allow the machine to control the operation of the various components of the machine. The connections allow the machine control to know the operating status of each component. The machine control has computer readable instructions for carrying out the functions and operations of the various parts of the machine as described above and for receiving and recording data about the same.

The machine control 23 can be implemented as a programmed general purpose computer, or a single special purpose integrated circuit (e.g., ASIC) having a main or central processor section for overall, machine control, and separate sections dedicated to performing various different specific computations, functions and other processes under control of the central processor section. The machine control 23 can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described or carrying out functions described herein can be used as the machine control 23.

Alternate Pump System

Figure 18:
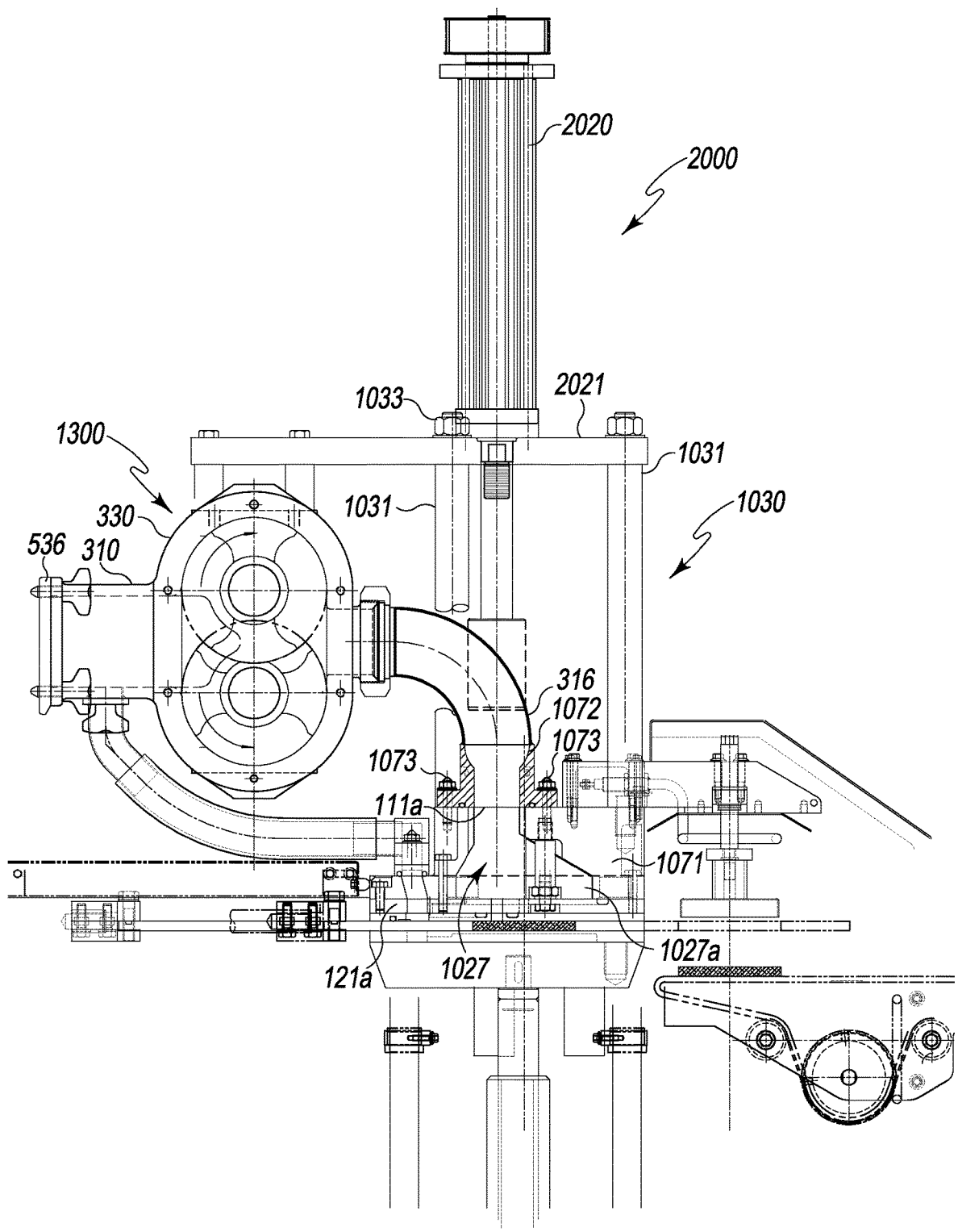
FIG. 18 is a side view of the fill plunger in a depressed position.

In an alternate embodiment, the molding machine comprises an alternate pump system 1300 connected to a fill plunger system 2000 for pressurizing the food mass as illustrated in FIG. 18. The pump system 1300 and fill plunger system 2000 are together interfit between outlet flange 536 of the hopper and the fill plate 121a of the molding apparatus, as in the previously described embodiment. The pump system includes the rotary pump 330 and the pump motor 350 together as previously described but mounted 90 degrees from the previously described embodiment to a horizontal motor-to-pump orientation (see FIG. 20). The rotary pump output passage 316 channels the food mass from the pump into an alternate intake manifold 1027. The intake manifold is similar to the manifold 27 except a truncated triangular cross-section block 1027a is bolted inside the manifold 1027 to decrease the degree of flare or expansion of the manifold in the longitudinal direction. This is done for example for single cavity filling of ground beef products through a slot fill to for operational reasons to reduce manifold volume to make some products more responsive to compression or pressurizing. The pump output passage 316 is connected to the intake manifold 1027 at the manifold inlet passage 111a. The intake manifold 1027 is enclosed within a lower housing 1071. An upper housing 1072 is disposed above the lower housing 1071 and secured to the lower housing 1071 using flange nuts and studs 1073. The manifold inlet passage 111a is open into the upper housing 1072.

In one embodiment, the fill plunger system 2000 comprises a pair of plungers 2010. Plungers 2010 move between a raised position and an extended position. In its raised position, the tip 2011 of the plunger is within the upper housing 1072 just above the intake manifold 1027. In an extended position, the plunger extends into the intake manifold 1027 to displace a pre-determined volume of food mass in the intake manifold. The upper housing 1072 comprises a plunger channel 1075 in communication with an opening 1076 into the intake manifold to allow vertical movement of the plunger through the plunger channel 1075 and into the intake manifold. The vertical movement of the plunger 2010 into the intake manifold 1022 varies the volume, and accordingly the pressure of the food mass within the intake manifold. The increase in food mass pressure as a result of the displacement of the food mass in the manifold can be coordinated with the reciprocating movement of the mold plate. For example, pressure may be increased within the intake manifold using the fill plunger system prior to the mold cavity coming into communication with the intake manifold by beginning the downward stroke of the plunger, and continuing the downward stroke of the plunger into the manifold as the mold plate slides into the fill position. Various other timing combinations of the plunger movement and the mold plate movement can be used to achieve the desired mold cavity filling dynamic.

To ensure a secure seal between the plunger channel 1075 and the plunger 2010 such that food mass does not escape from the plunger channel 1075, a seal, such as a rubber or silicone O-ring is disposed along the circumference of the plunger channel 1075. Any other suitable seal known to one skilled in the art can also be used.

Figure 20:
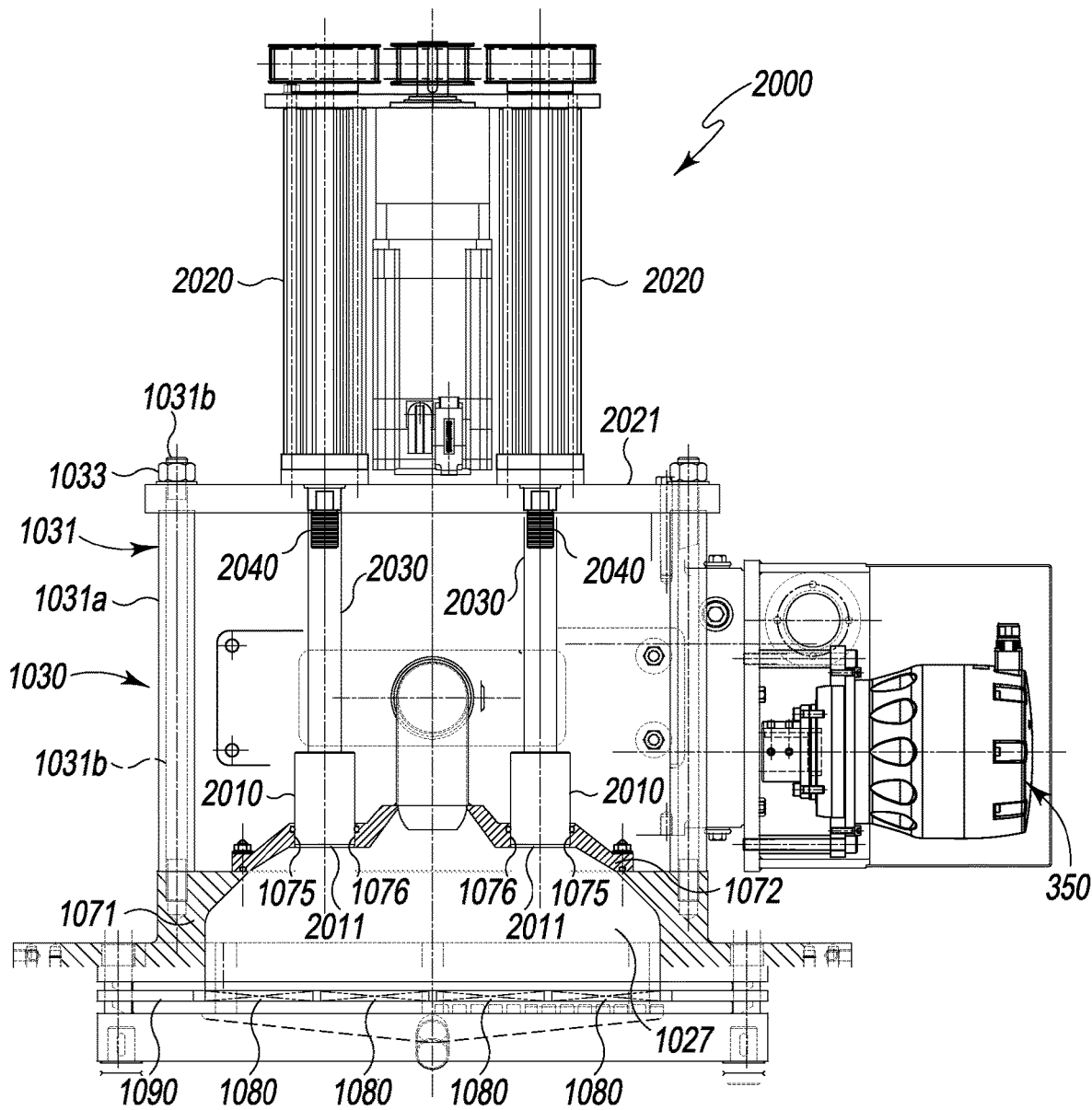
FIG. 20 is a front view of the fill plunger system.

Movement of the plungers 2010 are controlled by a linear actuator 2020. Plungers 2010 are connected to a plunger shaft 2030, which are connected to an actuating rod 2050 (FIG. 22) as part of the linear actuator 2020. The actuators 2020 are supported on top of a platform 2021, which is secured to the lower housing 1071 by a support frame 1030 comprising vertical supports 1031. Vertical supports 1031 each comprise an external tube 1031a with an internal threaded shaft 1031b (FIG. 20). The shaft extends out opposite ends of the tube and is threaded into the lower housing 1071 and receives a nut 1033 on top to secure the platform 2021 to the vertical supports 1031, and to the lower housing 1071.

Figure 21:
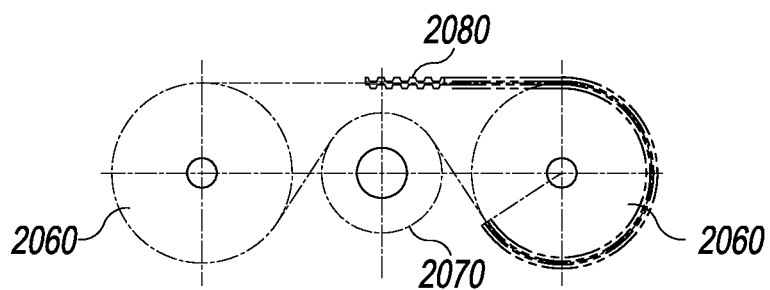
FIG. 21 is a top view of the fill plunger drive system.
Figure 22:
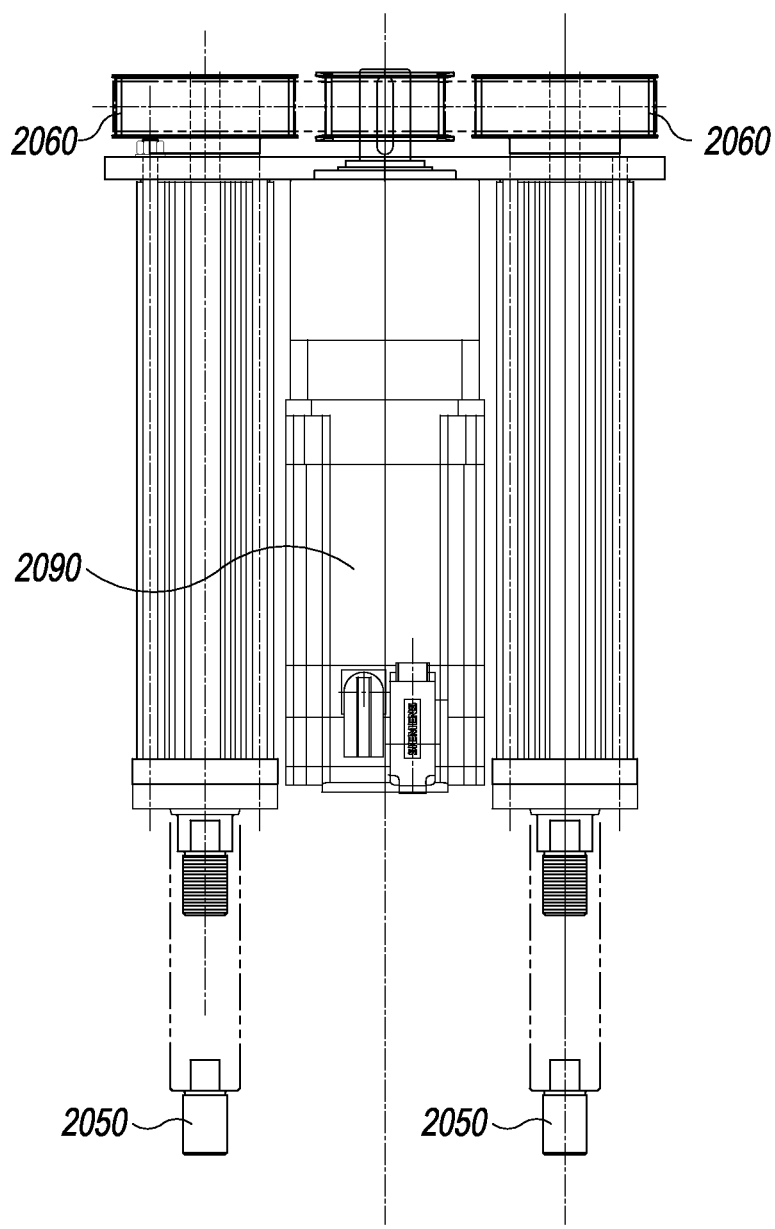
FIG. 22 is a front view of the fill plunger drive system.
Figure 23:
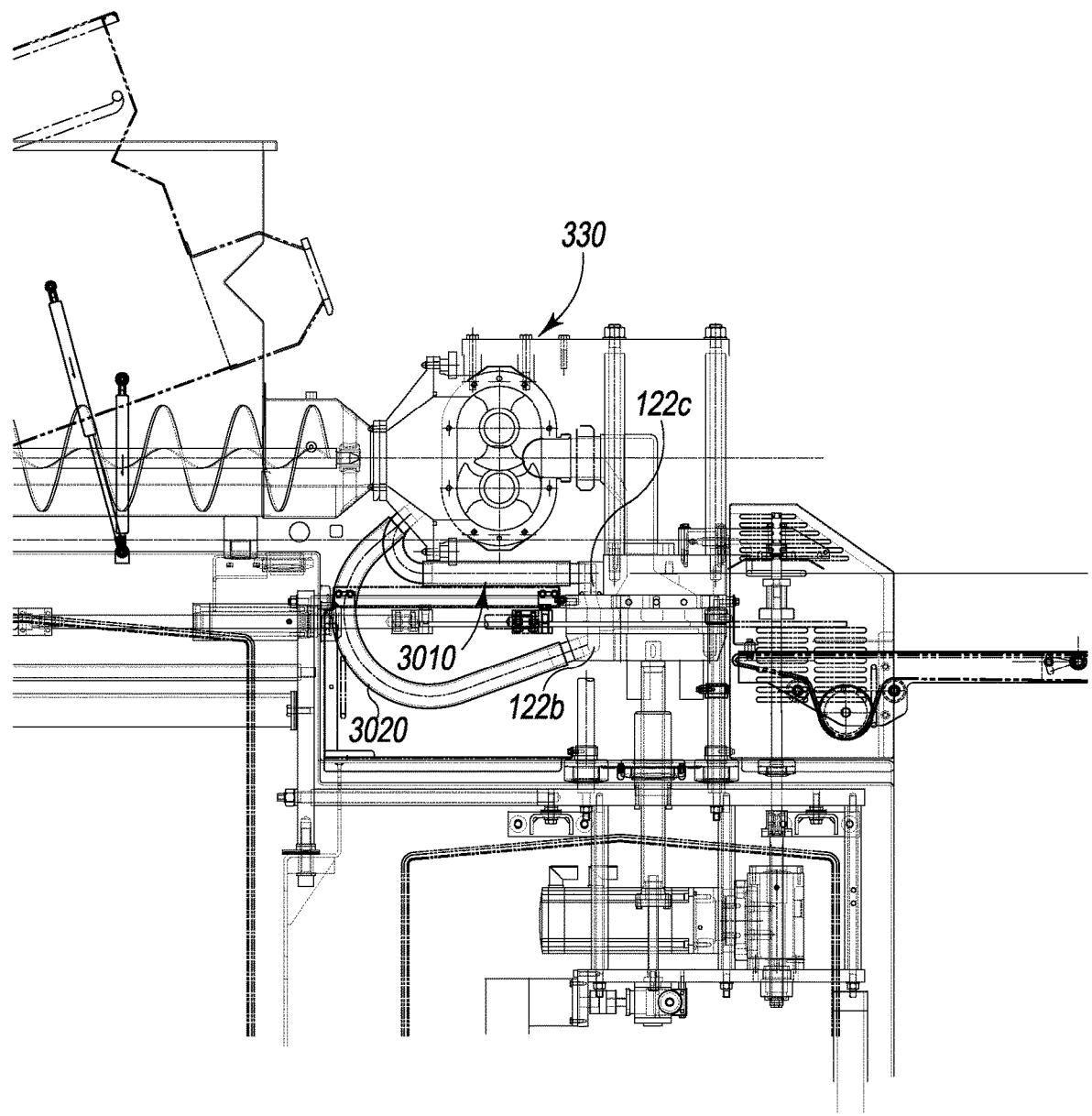
FIG. 23 is a side view of one embodiment of a breather system.
Figure 24A:
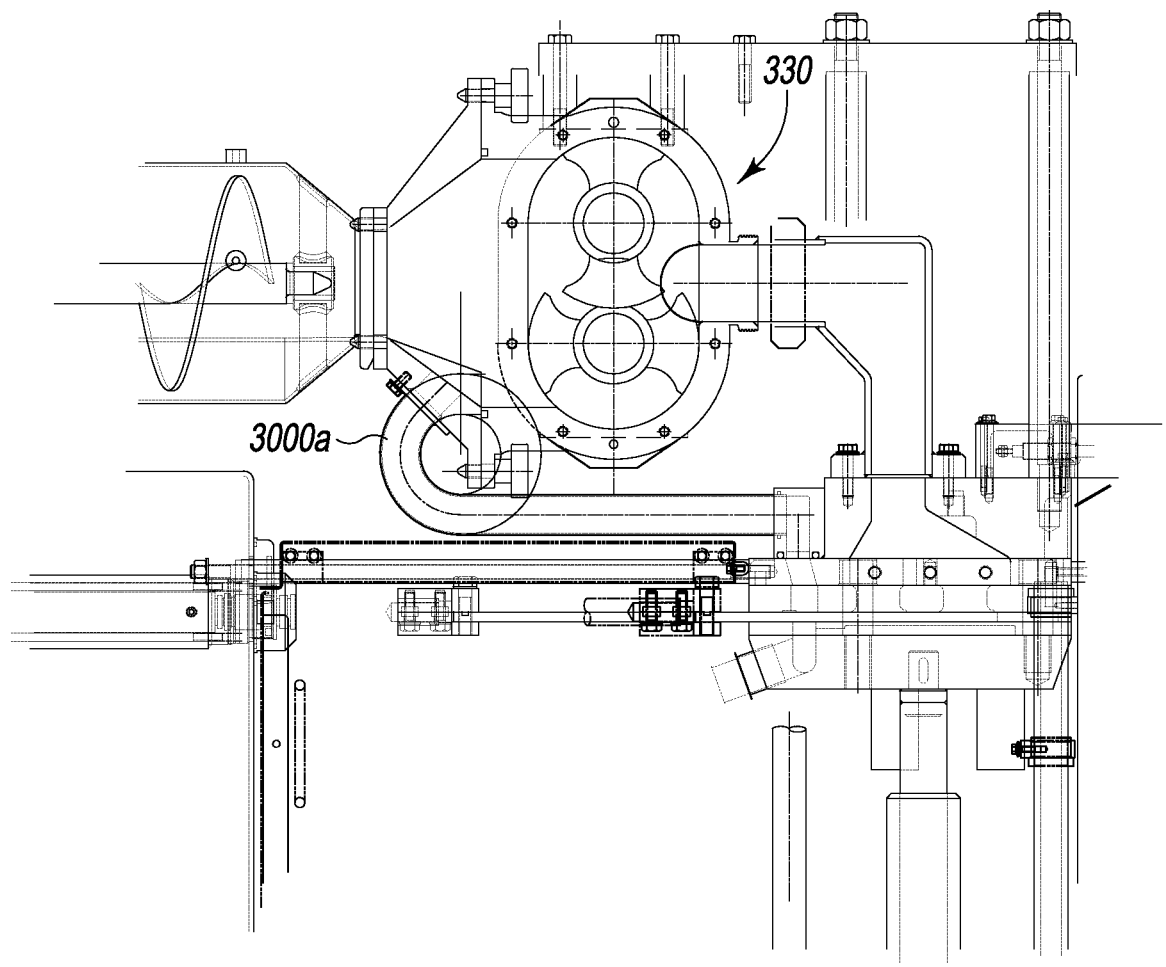
FIGS. 24a-24d are side views of alternate embodiments of a breather system.
Figure 24B:
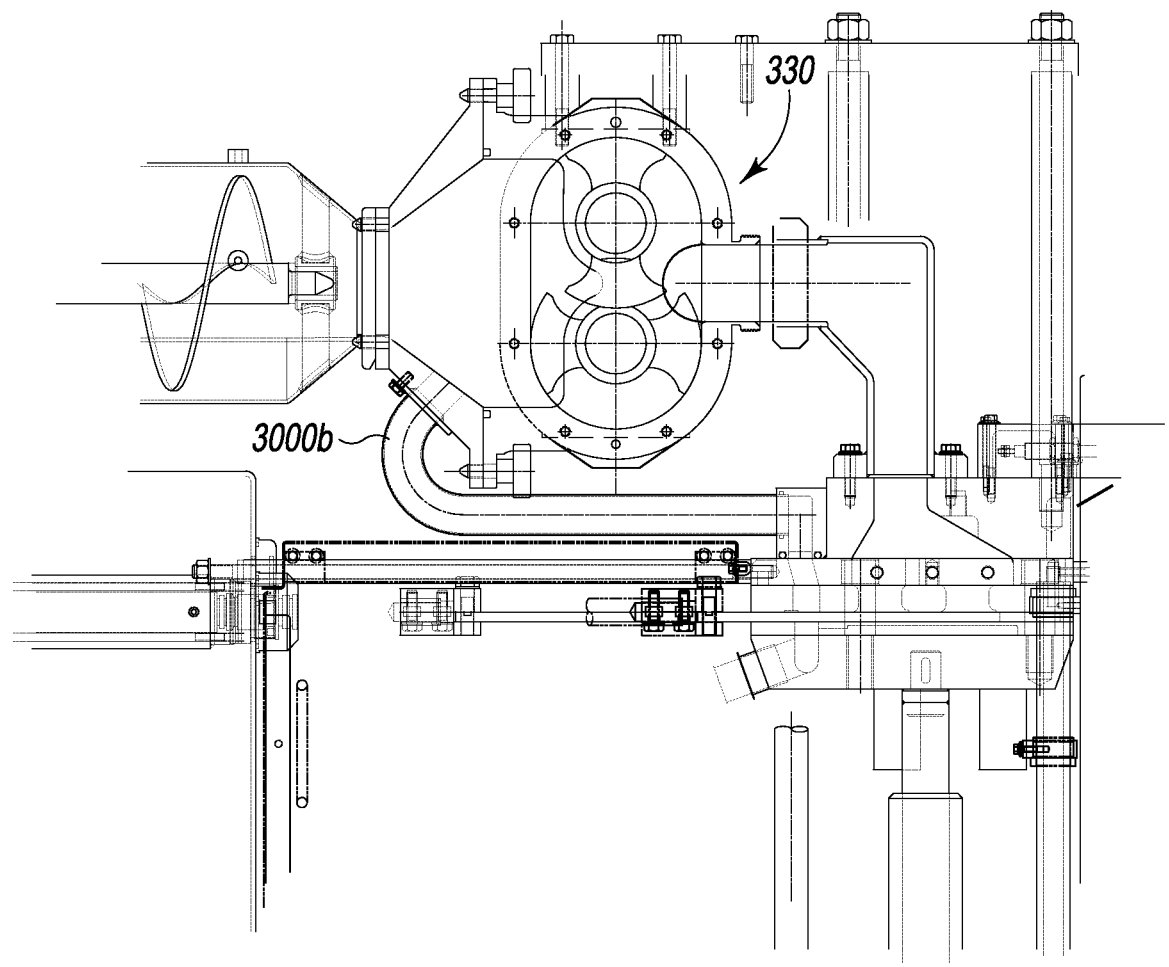
Figure 24C:
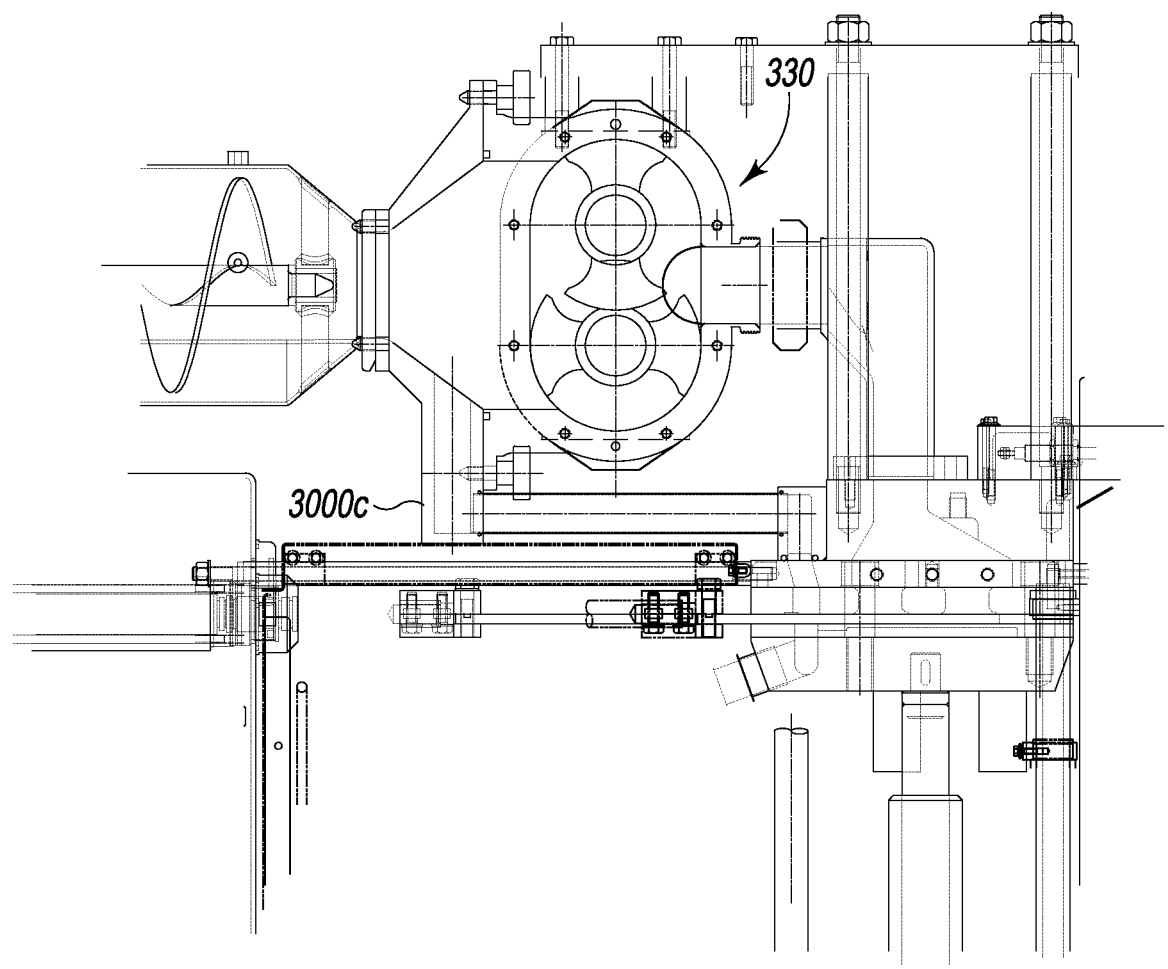
Figure 24D:
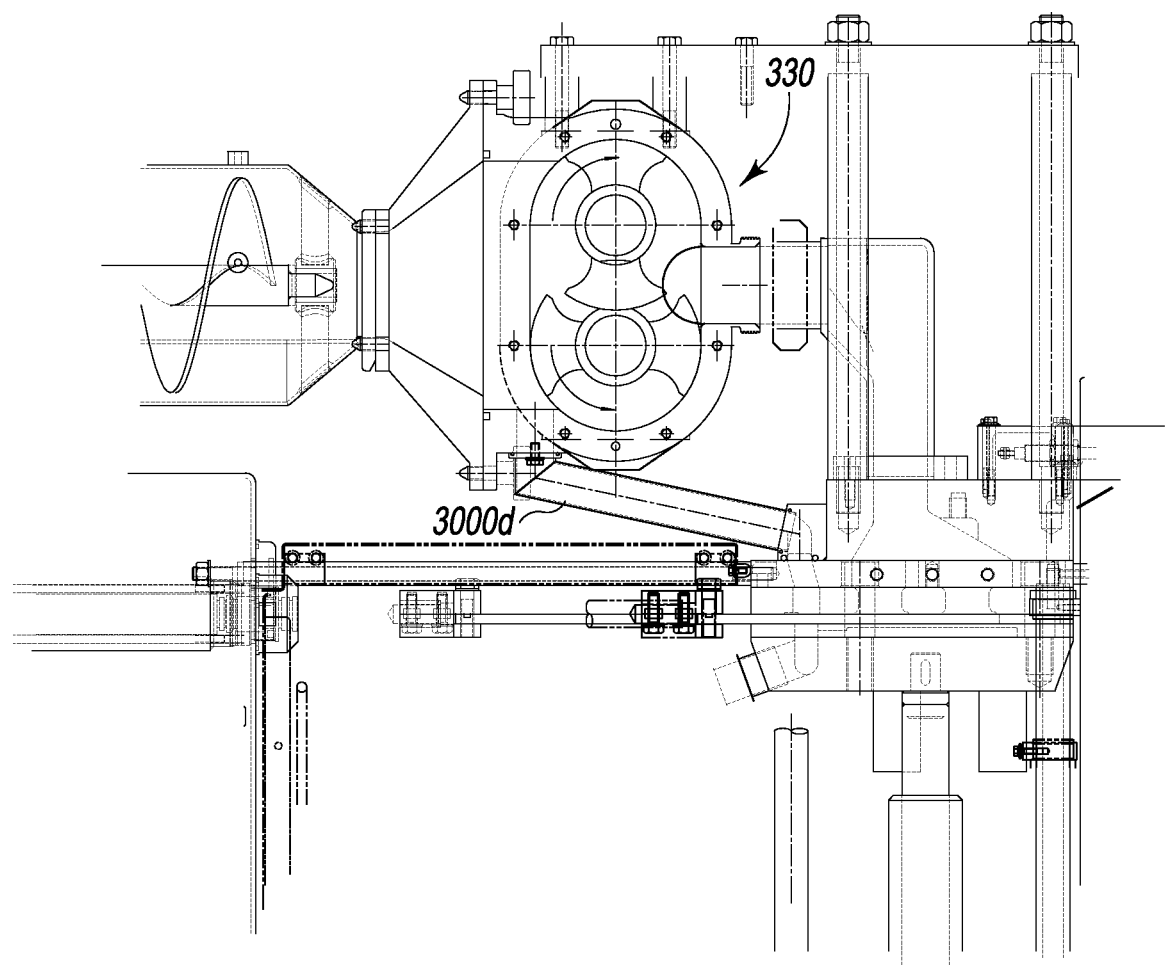

One embodiment of the drive mechanism for the linear actuators 2020 is illustrated in FIGS. 21 and 22. Revolution of a pair of toothed driven gears 2060 disposed at the top of the pair of linear actuators 2020 extends and retracts the actuating rods 2050 by an internal screw drive or other rotary-to-linear movement converter. The toothed driven gears are driven by a toothed belt 2080, driven by a toothed driving gear 2070. Toothed driving gear 2070 is connected at the center of the gear to a motor 2090, such as a servomotor. The motor drives the gear 2070 which simultaneously drives both toothed driven gears 2060 such that the movement of the two plungers are in synchronization. Any other suitable method of driving the driving gear, such as the use of a drive belt, can also be used.

Other means of driving the plungers can be used, such as servo-motor linear actuators, pneumatic or hydraulic cylinders, etc.

Figure 19:
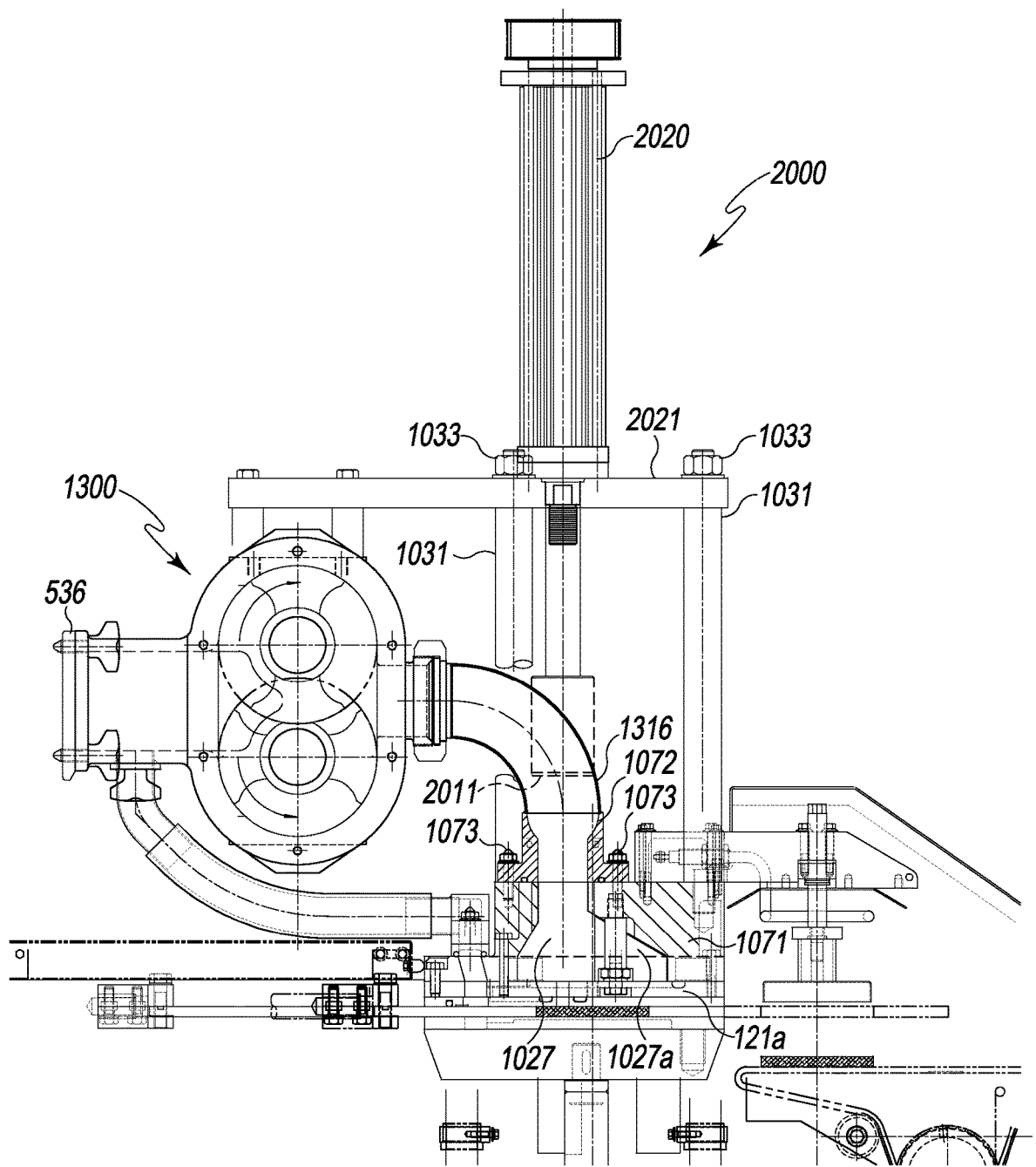
FIG. 19 is a side view of the fill plunger in a raised position.

Plungers can be any suitable size or shape, providing the desired cross-sectional area and volume of food mass displacement, and accordingly, the desired increase in pressure for a particular type of food mass and/or mold plate. The shape of the intake manifold opening 1076 and the plunger channel 1075 are shaped accordingly to complement the shape and size of the plungers. The extension distance of the plungers into the manifold can vary according to the desired fill pressure. The fill plunger system can be used with any type of mold plate 1090. In one embodiment, the plunger in its raised position may be raised such that the tip 2011 of the plunger is above the upper housing 1072, as illustrated in FIG. 19. In one embodiment, the plunger in its extended position extends into the upper housing 1072, but remains above the manifold.

Alternate Hopper Tilt

Figure 25:
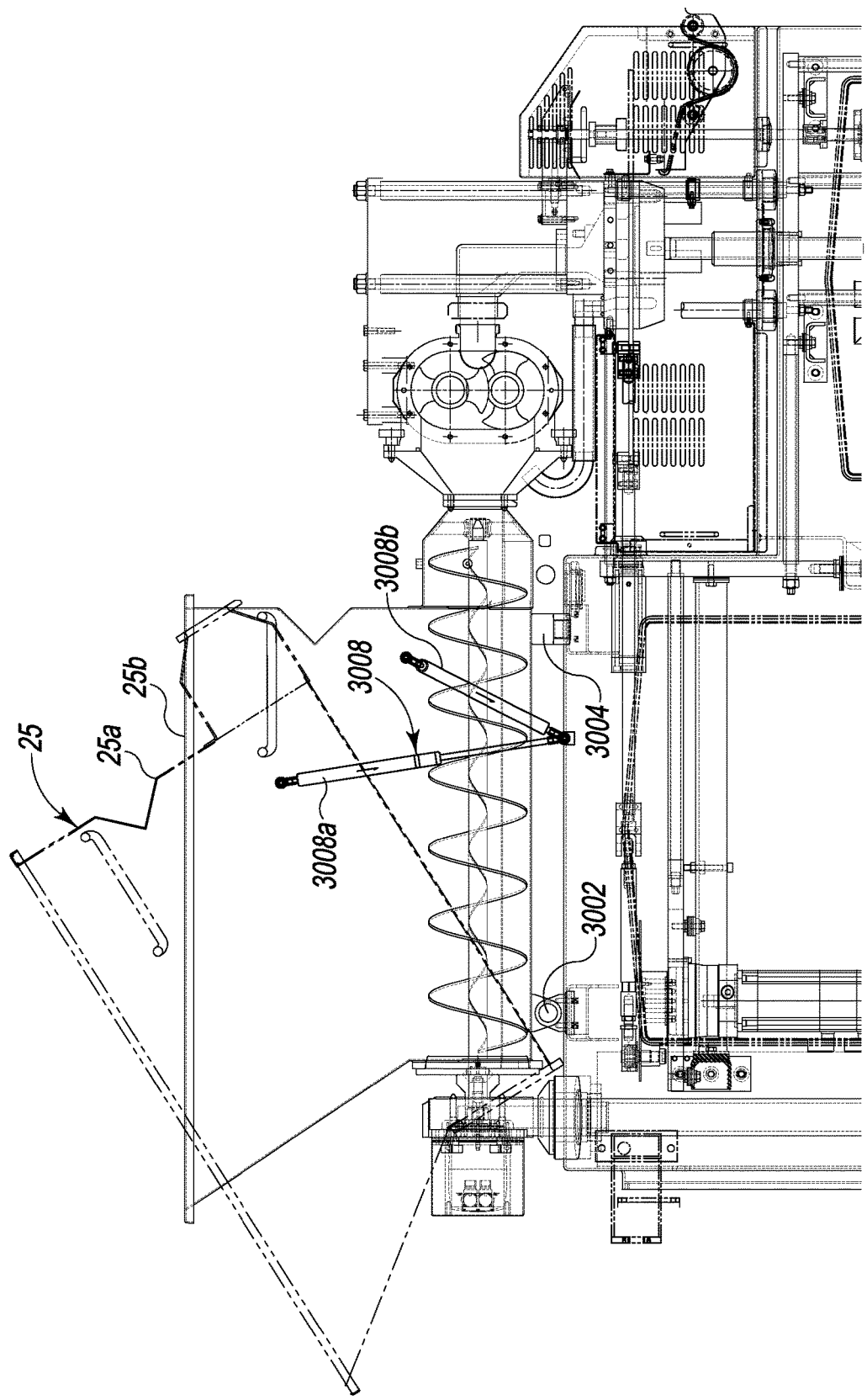
FIG. 25 is a side view of an alternate embodiment forming machine.

FIG. 25 illustrates an alternate embodiment wherein a hopper 25 is tilted toward the back of the machine for cleaning. The hopper is shown in a tilted-back position and up cleaning position 25a and a normal operating position 25b. The hopper is supported on the machine base by two laterally spaced apart pinned connections 3002 at the rear (only foreground one being visible in the Figure) and by two laterally spaced apart plastic pads or pucks 3004 at the front (only foreground one being visible in the Figure). The pinned connections and pads are arranged in a rectangular grid pattern. A pneumatic or hydraulic cylinder actuator, or other known linear actuator 3008 is used to tilt the hopper. The actuator is shown in an extended-hopper tilt position 3008a and a retracted-hopper in use position 3008b.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A food product forming machine comprising:
   a food supply configured to contain food mass;
   a positive displacement pump having an inlet connected to the food supply and configured to pump food mass at a pressure through an outlet of the positive displacement pump;
   a molding mechanism having a mold plate, the mold plate including a plurality of cavities and being reciprocated by a mold plate drive between a cavity fill position and a cavity discharge position, each cavity having an inlet and an outlet; and a manifold including an inlet and an outlet, the outlet of the manifold completely covering the inlets of the cavities when the mold plate is in the cavity fill position, wherein the manifold is configured to receive food mass from the outlet of the positive displacement pump through the inlet of the manifold, and food mass is configured to pass through the outlet of the manifold and into the inlets of the cavities when the mold plate is in the cavity fill position, wherein the manifold has a truncated triangular cross-section defined by a first wall having a first flare and a second wall having a second flare different than the first flare.

2. The food product forming machine of claim 1, wherein the pressure is a first pressure, the food product forming machine further comprising at least one plunger configured to extend into the manifold to increase a pressure of the food mass in the manifold to a second pressure higher than the first pressure.

3. The food product forming machine of claim 1, wherein the second flare has a decreased degree of flare relative to the first flare.

4. The food product forming machine of claim 3, wherein an axial centerline of the outlet of the positive displacement pump is offset from an axial centerline of the outlet of the manifold, the axial centerline of the outlet of the manifold passing through the second wall.

5. The food product forming machine of claim 1, wherein the outlet of the manifold is larger than the inlet of the manifold.

6. The food product forming machine of claim 5, wherein an axial centerline of the outlet of the positive displacement pump is offset from an axial centerline of the outlet of the manifold, the axial centerline of the outlet of the manifold passing through the second wall.

7. The food product forming machine of claim 6, wherein the second flare has a decreased degree of flare relative to the first flare.

8. The food product forming machine of claim 1, wherein an axial centerline of the outlet of the positive displacement pump is offset from an axial centerline of the outlet of the manifold, the axial centerline of the outlet of the manifold passing through the second wall.

9. A food product forming machine comprising:
a base configured to seat on a surface;
a hopper configured to contain food mass, the hopper mounted on the base, the hopper having an inlet and an outlet;
a positive displacement pump mounted on the base, the positive displacement pump connected to the outlet of the hopper and configured to pump food mass at a pressure, the positive displacement pump having an inlet and an outlet;
a pump output passage having an inlet selectively connectable to the outlet of the positive displacement pump, wherein the positive displacement pump being positionable in a working position wherein the outlet of the positive displacement pump is connected to the inlet of the pump output passage, and in a maintenance position wherein the outlet of the positive displacement pump is not connected to the inlet of the pump output passage;
a pump motor attached to the positive displacement pump;

a molding mechanism having a mold plate with a mold cavity, the molding mechanism being mounted on the base, the mold plate being reciprocated by a mold plate drive between a cavity fill position and a cavity discharge position; and a manifold mounted on the base, the manifold including an inlet connected to an outlet of the pump output passage and having an outlet passageway connected to an inlet of the molding mechanism for filling the mold cavity of the mold plate.

10. The food product forming machine of claim 9, wherein the positive displacement pump is rotatably coupled to the base, wherein the positive displacement pump is rotated relative to the base to move the positive displacement pump into the working position and into the maintenance position.

11. The food product forming machine of claim 10, wherein the positive displacement pump is substantially perpendicular to the mold plate when the positive displacement pump is in the working position and the positive displacement pump is parallel to the mold plate when in the maintenance position.

12. The food product forming machine of claim 9, wherein the inlet and the outlet of the positive displacement pump are positioned above the mold plate and the manifold.

13. The food product forming machine of claim 12, wherein the positive displacement pump is a rotary food pump.

14. The food product forming machine of claim 9, further comprising a feed screw at least partially positioned in the hopper and including a front portion extending beyond the hopper and enclosed by the outlet of the hopper, the feed screw being removable from the hopper.

15. The food product forming machine of claim 9, wherein the base defines a longitudinal extent, and wherein the hopper is tiltable relative to the base around an axis which is parallel to the longitudinal extent of the base.

16. The food product forming machine of claim 15, wherein the hopper is mounted to the base by retaining pins mounted in supports attached to the base, wherein the hopper tilts around predetermined ones of the pins.

17. The food product forming machine of claim 16, further comprising a first support extending from the base and a first pair of retaining pins configured to be connected to the hopper and to the first support, wherein the first support and the first pair of retaining pins enable the hopper to be tilted in a first direction relative to the longitudinal extent, and a second support extending from the base and a second pair of retaining pins configured to be connected to the hopper and to the second support, wherein the second support and the second pair of retaining pins enable the hopper to be tilted in a second direction relative to the longitudinal extent.

18. The food product forming machine of claim 9, wherein the food product forming machine defines a longitudinal extent, and wherein the hopper is tiltable relative to the base around an axis which is perpendicular to the longitudinal extent of the food product forming machine.

19. The food product forming machine of claim 18, further comprising a support extending from the base and a pair of retaining pins configured to be connected to the hopper and to the support, wherein the support and the pair of retaining pins enable the hopper to be tilted.

20. The food product forming machine of claim 19, further comprising a pair of pads extending from the base upon which the hopper is configured to rest when not tilted.

21. The food product forming machine of claim 19, further comprising an actuator for tilting the hopper.

22. The food product forming machine of claim 9, wherein the mold plate is removable.

23. The food product forming machine of claim 9, further comprising
- a feed screw at least partially positioned in the hopper and including a front portion extending beyond the hopper and enclosed by the outlet of the hopper, the feed screw being removable from the hopper;
- wherein the base defines a longitudinal extent, and wherein the hopper is tiltable relative to the base around an axis which is parallel to the longitudinal extent of the base; and
- wherein the mold plate is removable.

* * * * *